(12) United States Patent
Huang

(10) Patent No.: US 9,091,801 B2
(45) Date of Patent: Jul. 28, 2015

(54) IMAGE CAPTURING LENS SYSTEM

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/010,231

(22) Filed: Aug. 26, 2013

(65) Prior Publication Data

US 2015/0022714 A1    Jan. 22, 2015

(30) Foreign Application Priority Data

Jul. 17, 2013    (TW) .............. 102125504 A

(51) Int. Cl.
*G02B 13/18*    (2006.01)
*G02B 3/04*    (2006.01)
*G02B 13/00*    (2006.01)

(52) U.S. Cl.
CPC .............. *G02B 3/04* (2013.01); *G02B 13/0045* (2013.01); *G02B 13/18* (2013.01)

(58) Field of Classification Search
CPC ....... G02B 13/18; G02B 9/60; G02B 13/0045
USPC ........................................... 359/714
See application file for complete search history.

(56) References Cited

U.S. PATENT DOCUMENTS

| 8,000,031 B1 * | 8/2011 | Tsai ............... 359/714 |
| 2008/0266678 A1 * | 10/2008 | Tang ............... 359/781 |
| 2012/0140104 A1 * | 6/2012 | Ozaki ............ 348/335 |
| 2012/0154929 A1 * | 6/2012 | Tsai et al. ....... 359/714 |

FOREIGN PATENT DOCUMENTS

| JP | 1974-010026 A | 1/1974 |
| JP | 2009-186596 A | 8/2009 |
| JP | 2009-294528 A | 12/2009 |
| JP | 2012-194597 A | 10/2012 |

* cited by examiner

*Primary Examiner* — Ricky Mack
*Assistant Examiner* — Kristina Deherrera
(74) *Attorney, Agent, or Firm* — Locke Lord LLP; Tim Tingkang Xia, Esq.

(57) ABSTRACT

An image capturing lens system includes five lens elements with refractive power, in order from an object side to an image side, a first lens element, a second lens element, a third lens element, a fourth lens element and a fifth lens element. The first lens element with positive refractive power has a convex object-side surface. The second lens element has positive refractive power. The third lens element has negative refractive power. The fourth lens element with refractive power has a concave image-side surface in a paraxial region thereof, wherein the surfaces thereof are aspheric. The fifth lens element with refractive power has a concave image-side surface in a paraxial region thereof, wherein the image-side surface of the fifth lens element has at least one inflection point, and the surfaces thereof are aspheric.

20 Claims, 19 Drawing Sheets

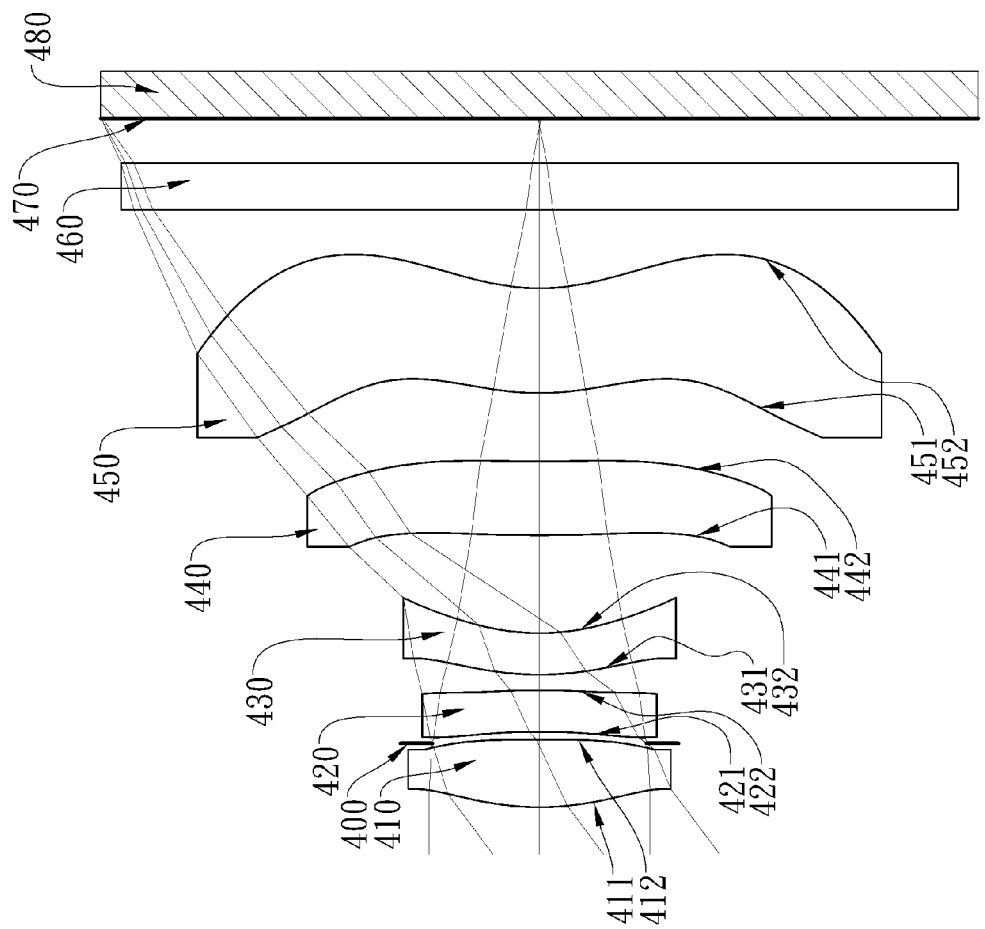

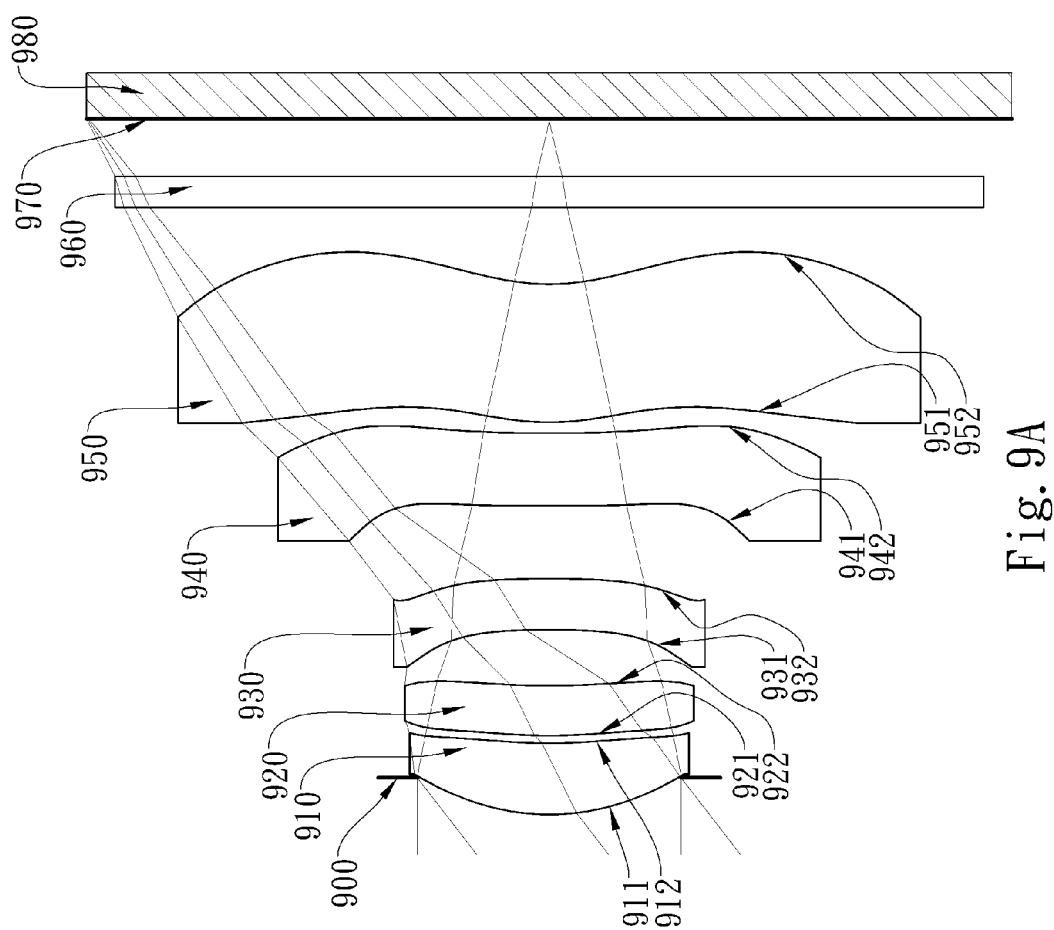

IMAGE CAPTURING LENS SYSTEM

RELATED APPLICATIONS

This application claims priority to Taiwan Application Serial Number 102125504, filed Jul. 17, 2013, which is incorporated by reference herein in its entirety.

BACKGROUND

1. Technical Field

The present disclosure relates to an image capturing lens system. More particularly, the present disclosure relates to a compact image capturing lens system applicable to portable electronic products.

2. Description of Related Art

In recent years, with the popularity of mobile products having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure lens structure. Due to the popularity of mobile products with high-end specifications, such as smart phones and tablet personal computers, the requirements for high resolution and image quality of present compact optical systems increase significantly. However, the conventional optical systems with four-element lens structure cannot satisfy these requirements of the compact optical systems.

Other conventional compact optical systems with five-element lens structure enhance image quality and resolution. However, the refractive power of the five-element lens structure is often not well distributed which is not favorable for correcting the chromatic aberration and spherical aberration of the optical systems. Moreover, the refractive power of the five-element lens structure is thereby not balanced and cannot satisfy the requirements of the optical systems featuring high image quality accordingly.

As a result, there is an increasing demand for compact optical systems featuring good chromatic aberration and spherical aberration correction abilities as well as balanced refractive power.

SUMMARY

According to one aspect of the present disclosure, an image capturing lens system includes five lens elements with refractive power, in order from an object side to an image side, a first lens element, a second lens element, a third lens element, a fourth lens element and a fifth lens element. The first lens element with positive refractive power has a convex object-side surface. The second lens element has positive refractive power. The third lens element has negative refractive power. The fourth lens element with refractive power has a concave image-side surface in a paraxial region thereof, wherein an object-side surface and the image-side surface of the fourth lens element are aspheric. The fifth lens element with refractive power has a concave image-side surface in a paraxial region thereof, wherein the image-side surface of the fifth lens element has at least one inflection point, and an object-side surface and the image-side surface of the fifth lens element are aspheric. When a focal length of the first lens element is f1, and a focal length of the third lens element is f3, the following condition is satisfied:

$$-1.5 < f1/f3 < 0.$$

According to another aspect of the present disclosure, an image capturing device includes the image capturing lens system according to the aspect and an image sensor.

BRIEF DESCRIPTION OF THE DRAWINGS

The disclosure can be more fully understood by reading the following detailed description of the embodiment, with reference made to the accompanying drawings as follows:

FIG. 4A is a schematic view of an image capturing lens system according to the 4th embodiment of the present disclosure;

FIG. 9A is a schematic view of an image capturing lens system according to the 9th embodiment of the present disclosure;

DETAILED DESCRIPTION

Figure 1A:
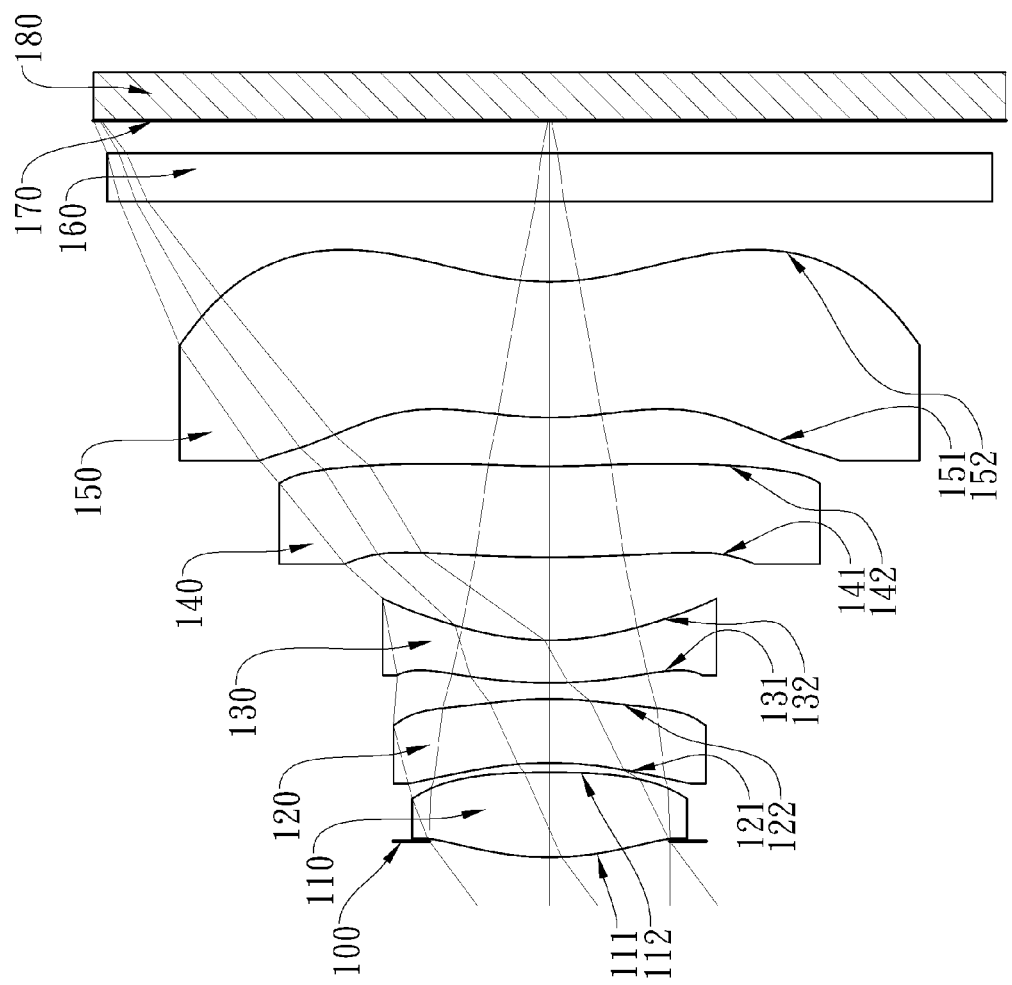
FIG. 1A is a schematic view of an image capturing lens system according to the 1st embodiment of the present disclosure.

An image capturing lens system includes five lens elements with refractive power, in order from an object side to an image side, a first lens element, a second lens element, a third lens element, a fourth lens element and a fifth lens element.

The first lens element has positive refractive power, so that it provides the image capturing lens system with the positive refractive power as it needs to be which is favorable for reducing the total track length of the image capturing lens system. The first lens element has a convex object-side surface, so that it is favorable for further reducing the total track length of the image capturing lens system.

The second lens element has positive refractive power, so that it is favorable for adjusting the light gathering ability of the first lens element by using the second lens element. The second lens element can have a concave object-side surface in a paraxial region thereof and a convex image-side surface in a paraxial region thereof, so that it is favorable for correcting the aberration.

The third lens element has negative refractive power, so that it is favorable for correcting the aberration of the image capturing lens system.

The fourth lens element has a concave image-side surface in a paraxial region thereof, so that it is favorable for correcting the Petzval sum so as to correct the image curvature. Moreover, both of the object-side surface and the image-side surface of the fourth lens element can have at least one inflection point, so that the incident angle of the off-axis on the image plane can be reduced so as to increase the responding efficiency of an image sensor.

The fifth lens element can have a convex object-side surface in a paraxial region thereof and has a concave image-side surface in a paraxial region thereof. Therefore, it is favorable for correcting the astigmatism. Furthermore, the image-side surface of the fifth lens element has at least one inflection point, so that it is favorable for correcting the aberration of the off-axis.

When a focal length of the first lens element is f1, and a focal length of the third lens element is f3, the following condition is satisfied: $-1.5 < f1/f3 < 0$. Therefore, it is favorable for keeping the refractive powers of the image capturing lens system balanced so as to achieve the best image quality. Preferably, the following condition is satisfied:

$-0.8 < f1/f3 < 0$.

When a focal length of the image capturing lens system is f, and a curvature radius of the image-side surface of the fourth lens element is R8, the following condition is satisfied: $0 < f/R8 < 2.5$. Therefore, it is favorable for correcting the Petzval sum effectively to improve the flatness of the image plane.

When a central thickness of a lens element is CT, a minimum central thickness of a lens element among all lens elements of the image capturing lens system is CTmin, and an axial distance between the third lens element and the fourth lens element is T34, the following condition is satisfied: $0.10 < CTmin/T34 < 0.80$. Therefore, it is favorable for assembling the lens elements so as to increase the manufacturing yield rate.

When a distance in parallel with an optical axis from an axial vertex on the image-side surface of the fifth lens element to a critical point on an image-side surface of the fifth lens element is Sc52, and a central thickness of the fifth lens element is CT5, the following condition is satisfied: $0.05 < Sc52/CT5 < 0.70$. Therefore, it is favorable for manufacturing and molding the lens elements so as to keep the arrangement of the lens elements more compact.

The aforementioned image capturing lens system further includes a stop, such as an aperture stop, which is disposed between an imaged object and the first lens element, wherein the stop is closer to the image side of the image capturing lens system than the axial vertex on the object-side surface of the first lens element. More specifically, the stop is located between the object-side surface of the first lens element and the image plane. When the above-mentioned condition is satisfied, it is favorable for maintaining the telecentric effect and increasing the field of view.

When the focal length of the first lens element is f1, and a focal length of the second lens element is f2, the following condition is satisfied: $0 < f1/f2 < 0.8$. Therefore, it is favorable for adjusting the light gathering ability of the first lens element by using the second lens element so as to keep a good chromatic aberration and spherical aberration correction abilities. Preferably, the following condition is satisfied: $0 < f1/f2 < 0.4$.

When the focal length of the first lens element is f1, a focal length of the fourth lens element is f4, and a focal length of the fifth lens element is f5, the following condition is satisfied: $0 < |f1/f4| + |f1/f5| < 0.70$. Therefore, it is favorable for balancing the refractive powers of the image capturing lens system so as to reduce the photosensitivity of the image capturing lens system.

When an Abbe number of the third lens element is V3, and the following condition is satisfied: $V3 < 30$. Therefore, the chromatic aberration of the image capturing lens system can be corrected.

When a curvature radius of the object-side surface of the second lens element is R3, and a curvature radius of the image-side surface of the first lens element is R2, the following condition is satisfied: $0 < R3/R2 < 1.2$. Therefore, it is favorable for reducing the spherical aberration and astigmatism.

When a vertical distance between an optical axis and a critical point on the image-side surface of the fifth lens element is Yc52, and a vertical distance between the optical axis and a critical point on the object-side surface of the fifth lens element is Yc51, the following condition is satisfied: $|Yc52| > |Yc51|$. Therefore, it is favorable for correcting the aberration of the off-axis.

When a distance in parallel with an optical axis from an axial vertex on the object-side surface of the fourth lens element to a maximum effective diameter position on the object-side surface of the fourth lens element is SAG41, a distance in parallel with the optical axis from an axial vertex on the image-side surface of the fourth lens element to a maximum effective diameter position on the image-side surface of the fourth lens element is SAG42, and a central thickness of the fourth lens element is CT4, the following condition is satisfied: $(|SAG41| + |SAG42|)/CT4 < 0.80$. Therefore, the surface shape and the thickness of the lens elements will be proper which are favorable for manufacturing and molding the lens elements and keeping the arrangement of the lens elements more compact.

When a central thickness of the second lens element is CT2, and a central thickness of the first lens element is CT1, the following condition is satisfied: $0 < CT2/CT1 < 1.0$. Therefore, it provides favorable moldability and homogeneity for lens elements.

When the curvature radius of the object-side surface of the second lens element is R3, and a curvature radius of the image-side surface of the second lens element is R4, the following condition is satisfied: |(R3−R4)/(R3+R4)|<0.30. Therefore, it is favorable for reducing the spherical aberration.

Figure 10:
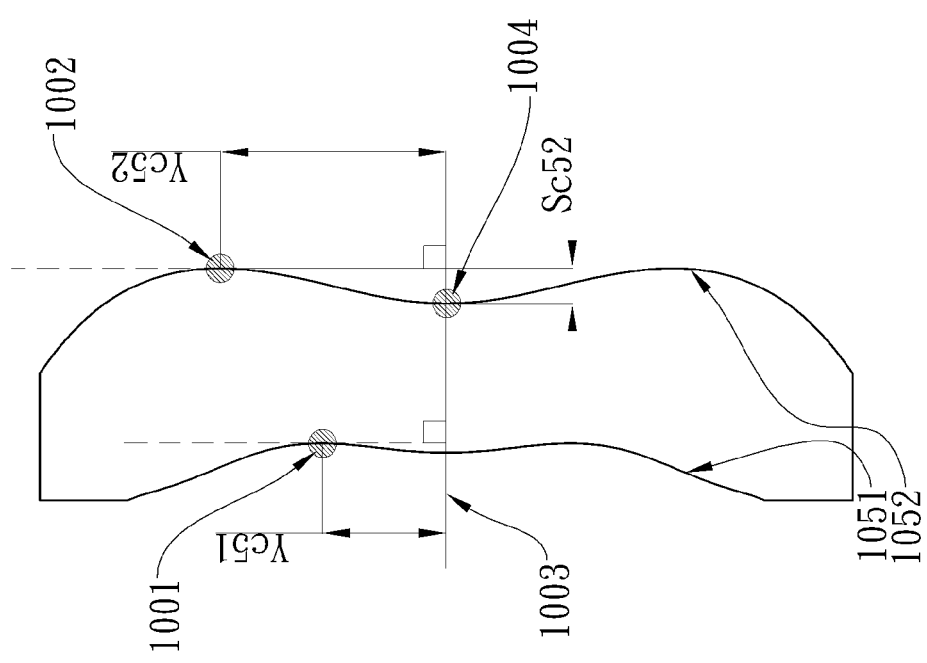
FIG. 10 shows the distances represented by Yc51, Yc52 and Sc52 of the conditions of the present disclosure.

In FIG. 10, the vertical distance between an optical axis 1003 and a critical point 1001 on the object-side surface 1051 of the fifth lens element is Yc51, the vertical distance between the optical axis 1003 and a critical point 1002 on the image-side surface 1052 of the fifth lens element is Yc52, and the distance in parallel with the optical axis 1003 from an axial vertex 1004 on the image-side surface 1052 of the fifth lens element to a critical point 1002 on an image-side surface 1052 of the fifth lens element is Sc52.

According to the image capturing lens system of the present disclosure, the lens elements can be made of plastic or glass material. When the lens elements are made of glass material, the distribution of the refractive power of the image capturing lens system can be more flexible to design. When the lens elements are made of plastic material, the manufacturing cost thereof can be reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the image capturing lens system can be effectively reduced.

According to the image capturing lens system of the present disclosure, the image capturing lens system can include at least one stop, such as an aperture stop, a glare stop or a field stop. Said glare stop or said field stop is for eliminating the stray light and thereby improving the image resolution thereof.

According to the image capturing lens system of the present disclosure, an aperture stop can be configured as a front stop or a middle stop. A front stop disposed between an imaged object and the first lens element can provide a longer distance between an exit pupil of the system and an image plane and which improves the image-sensing efficiency of the image sensor. A middle stop disposed between the first lens element and the image plane is favorable for enlarging the field of view of the system and thereby provides a wider field of view for the same.

According to the image capturing lens system of the present disclosure, when the lens element has a convex surface, it indicates that the surface is convex in the paraxial region thereof; and when the lens element has a concave surface, it indicates that the surface is concave in the paraxial region thereof. Particularly, the paraxial region thereof refers to the region of the surface where light rays travel close to an optical axis and an off-axis region thereof refers to the region of the surface where light rays travel away from the optical axis.

According to the image capturing lens system of the present disclosure, critical point is a non-axial point of the lens surface where its tangent is perpendicular to the optical axis.

According to the image capturing lens system of the present disclosure, the image capturing lens system is featured with good correction ability and high image quality, and can be applied to 3D (three-dimensional) image capturing applications, in products such as digital cameras, mobile devices and tablets.

According to the present disclosure, an image capturing device is provided. The image capturing device includes the image capturing lens system according to the aforementioned image capturing lens system of the present disclosure, and an image sensor. The image sensor is connected to the image capturing lens system. Therefore, it is favorable for maintaining the balance of refractive powers of the image capturing lens system so as to achieve the best image quality.

According to the above description of the present disclosure, the following 1st-9th specific embodiments are provided for further explanation.

1st Embodiment

Figure 1B:
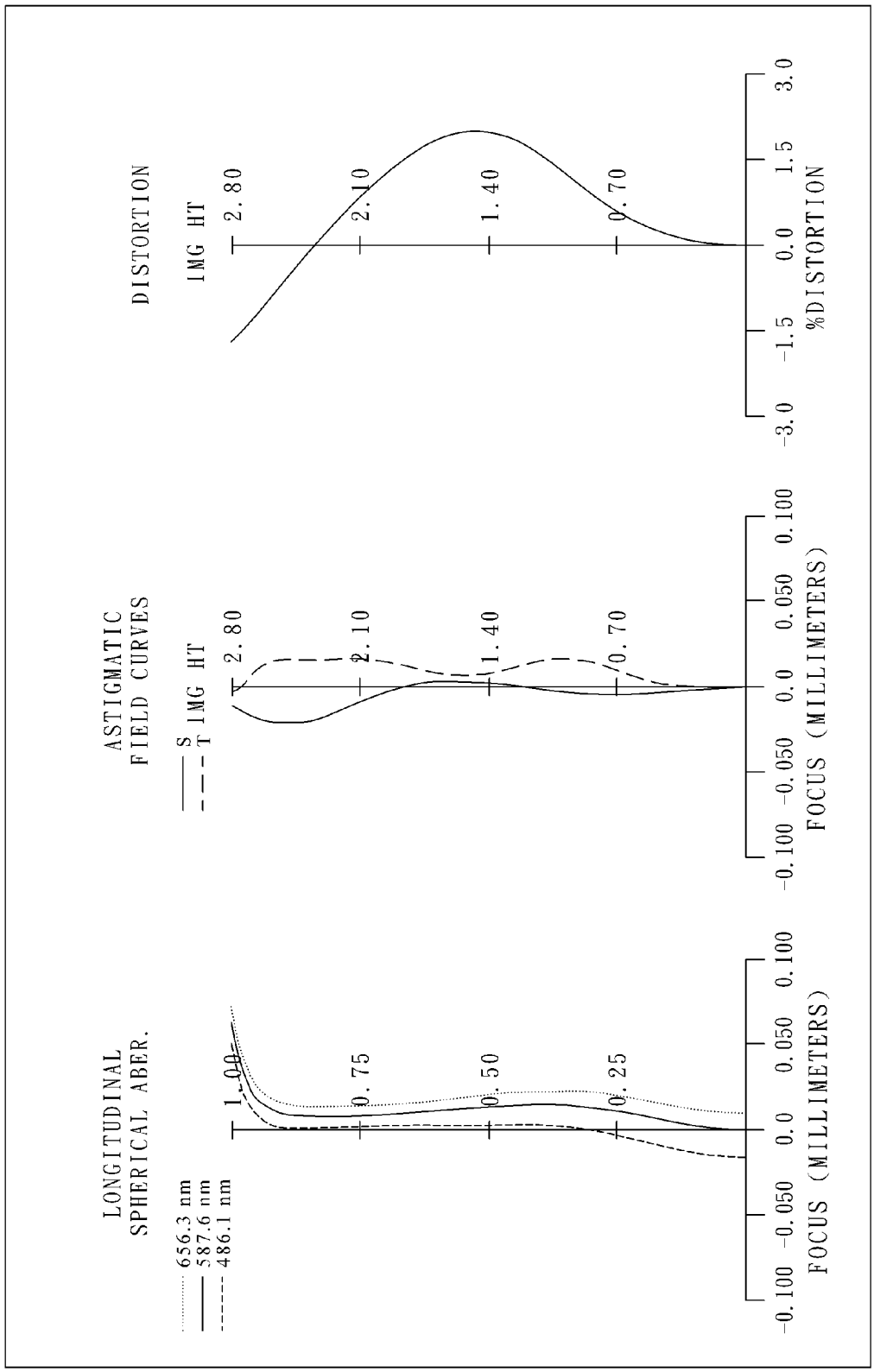
FIG. 1B shows spherical aberration curves, astigmatic field curves and a distortion curve of the image capturing lens system according to the 1st embodiment.

FIG. 1A is a schematic view of an image capturing lens system according to the 1st embodiment of the present disclosure. FIG. 1B shows spherical aberration curves, astigmatic field curves and a distortion curve of the image capturing lens system according to the 1st embodiment. In FIG. 1A, the image capturing lens system includes five lens elements with refractive power, in order from an object side to an image side, an aperture stop 100, a first lens element 110, a second lens element 120, a third lens element 130, a fourth lens element 140, a fifth lens element 150, an IR-cut filter 160, image plane 170 and an image sensor 180.

The first lens element 110 with positive refractive power has a convex object-side surface 111 in a paraxial region thereof and a convex image-side surface 112 in a paraxial region thereof. The first lens element 110 is made of plastic material and has the object-side surface 111 and the image-side surface 112 being aspheric.

The second lens element 120 with positive refractive power has a concave object-side surface 121 in a paraxial region thereof and a convex image-side surface 122 in a paraxial region thereof. The second lens element 120 is made of plastic material and has the object-side surface 121 and the image-side surface 122 being aspheric.

The third lens element 130 with negative refractive power has a convex object-side surface 131 in a paraxial region thereof and a concave image-side surface 132 in a paraxial region thereof. The third lens element 130 is made of plastic material and has the object-side surface 131 and the image-side surface 132 being aspheric.

The fourth lens element 140 with negative refractive power has a convex object-side surface 141 in a paraxial region thereof and a concave image-side surface 142 in a paraxial region thereof, wherein both of the object-side surface 141 and the image-side surface 142 of the fourth lens element 140 have at least one inflection point. The fourth lens element 140 is made of plastic material and has the object-side surface 141 and the image-side surface 142 being aspheric.

The fifth lens element 150 with negative refractive power has a convex object-side surface 151 in a paraxial region thereof and a concave image-side surface 152 in a paraxial region thereof, wherein the image-side surface 152 of the fifth lens element 150 has at least one inflection point. The fifth lens element 150 is made of plastic material and has the object-side surface 151 and the image-side surface 152 being aspheric.

The third lens element 130 has the minimum central thickness among all lens elements of the image capturing lens system. The aforementioned image capturing lens system further includes an aperture stop 100, which is disposed between an imaged object and the first lens element 110, wherein the aperture stop 100 is closer to the image side of the image capturing lens system than the axial vertex on the object-side surface 111 of the first lens element 110. The IR-cut filter 160 is made of glass material located between the fifth lens element 150 and the image plane 170, and will not affect the focal length of the image capturing lens system. The image capturing lens system further includes an image sensor 180 located on the image plane 170.

The equation of the aspheric surface profiles of the aforementioned lens elements of the 1st embodiment is expressed as follows:

$$X(Y)=(Y^2/R)/(1+\mathrm{sqrt}(1-(1+k)\times(Y/R)^2))+\Sigma_i(Ai)\times(Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing lens system according to the 1st embodiment, when a focal length of the image capturing lens system is f, an f-number of the image capturing lens system is Fno, and half of the maximal field of view of the image capturing lens system is HFOV, these parameters have the following values: f=3.82 mm; Fno=2.55; and HFOV=36.7 degrees.

In the image capturing lens system according to the 1st embodiment, when an Abbe number of the third lens element 130 is V3, the following condition is satisfied: V3=21.4.

In the image capturing lens system according to the 1st embodiment, when a central thickness of the second lens element 120 is CT2, a central thickness of the first lens element 110 is CT1, the following condition is satisfied: CT2/CT1=0.76.

In the image capturing lens system according to the 1st embodiment, when a minimum central thickness of a lens element among all lens elements of the image capturing lens system is CTmin, and an axial distance between the third lens element 130 and the fourth lens element 140 is T34, the following condition is satisfied: CTmin/T34=0.51.

In the image capturing lens system according to the 1st embodiment, when a curvature radius of the object-side surface 121 of the second lens element 120 is R3, and a curvature radius of the image-side surface 112 of the first lens element 110 is R2, the following condition is satisfied: R3/R2=0.26.

In the image capturing lens system according to the 1st embodiment, when the curvature radius of the object-side surface 121 of the second lens element 120 is R3, and a curvature radius of the image-side surface 122 of the second lens element 120 is R4, the following condition is satisfied: |(R3−R4)/(R3+R4)|=0.06.

In the image capturing lens system according to the 1st embodiment, when the focal length of the image capturing lens system is f, and a curvature radius of the image-side surface 142 of the fourth lens element 140 is R8, the following condition is satisfied: f/R8=0.63.

In the image capturing lens system according to the 1st embodiment, when a focal length of the first lens element 110 is f1, and a focal length of the second lens element 120 is f2, the following condition is satisfied: f1/f2=0.13.

In the image capturing lens system according to the 1st embodiment, when the focal length of the first lens element 110 is f1, and a focal length of the third lens element 130 is f3, the following condition is satisfied: f1/f3=−0.50.

In the image capturing lens system according to the 1st embodiment, when the focal length of the first lens element 110 is f1, a focal length of the fourth lens element 140 is f4, and a focal length of the fifth lens element 150 is f5, the following condition is satisfied: |f1/f4|+f1/f5|=0.20.

In the image capturing lens system according to the 1st embodiment, when a distance in parallel with an optical axis from an axial vertex on the object-side surface 141 of the fourth lens element 140 to a maximum effective diameter position on the object-side surface 141 of the fourth lens element 140 is SAG41, a distance in parallel with the optical axis from an axial vertex on the image-side surface 142 of the fourth lens element 140 to a maximum effective diameter position on the image-side surface 142 of the fourth lens element 140 is SAG42, and a central thickness of the fourth lens element 140 is CT4, the following condition is satisfied: (|SAG41|+|SAG42|)/CT4=0.26.

In the image capturing lens system according to the 1st embodiment, when a vertical distance between the optical axis and a critical point on the object-side surface 151 of the fifth lens element 150 is Yc51, and a vertical distance between the optical axis and a critical point on the image-side surface 152 of the fifth lens element 150 is Yc52, the following condition is satisfied: Yc51=0.71; and Yc52=1.29.

In the image capturing lens system according to the 1st embodiment, when a distance in parallel with the optical axis from an axial vertex on the image-side surface 152 of the fifth lens element 150 to a critical point on an image-side surface 152 of the fifth lens element 150 is Sc52, and a central thickness of the fifth lens element 150 is CT5, the following condition is satisfied: Sc52/CT5=0.24.

The detailed optical data of the 1st embodiment are shown in Table 1 and the aspheric surface data are shown in Table 2 below.

TABLE 1

1st Embodiment
f = 3.82 mm, Fno = 2.55, HFOV = 36.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.100 | | | | |
| 2 | Lens 1 | 1.857 | ASP | 0.528 | Plastic | 1.544 | 55.9 | 2.91 |
| 3 | | −9.706 | ASP | 0.060 | | | | |
| 4 | Lens 2 | −2.539 | ASP | 0.399 | Plastic | 1.583 | 30.2 | 22.62 |
| 5 | | −2.253 | ASP | 0.100 | | | | |
| 6 | Lens 3 | 3.166 | ASP | 0.265 | Plastic | 1.650 | 21.4 | −5.84 |
| 7 | | 1.670 | ASP | 0.518 | | | | |
| 8 | Lens 4 | 8.634 | ASP | 0.567 | Plastic | 1.530 | 55.8 | −41.17 |
| 9 | | 6.045 | ASP | 0.304 | | | | |

TABLE 1-continued

1st Embodiment
f = 3.82 mm, Fno = 2.55, HFOV = 36.7 deg.

| Surface # | | Curvature Radius | | Thickness | Material | Index | Abbe # | Focal Length |
|---|---|---|---|---|---|---|---|---|
| 10 | Lens 5 | 2.250 | ASP | 0.846 | Plastic | 1.535 | 55.7 | −23.15 |
| 11 | | 1.655 | ASP | 0.500 | | | | |
| 12 | IR-cut filter | Plano | | 0.300 | Glass | 1.517 | 64.2 | — |
| 13 | | Plano | | 0.206 | | | | |
| 14 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k = | −3.0246E+00 | −1.0000E+00 | 6.5958E+00 | −6.5807E+00 | −1.0000E+00 |
| A4 = | −1.9827E−02 | −3.4712E−01 | −9.3802E−02 | 2.1652E−01 | 3.3947E−02 |
| A6 = | 1.4052E−03 | 1.3032E−01 | 5.3840E−01 | −6.9872E−03 | −6.7734E−02 |
| A8 = | −3.4011E−01 | 1.0407E+00 | 2.3407E−01 | −3.7677E−01 | −2.6786E−01 |
| A10 = | 4.4880E−01 | −2.6311E+00 | −1.6947E+00 | 1.9671E−01 | 4.0194E−01 |
| A12 = | −3.3542E−01 | 1.8683E+00 | 1.3857E+00 | −4.2291E−02 | −2.5386E−01 |
| A14 = | −7.8802E−02 | −2.0670E−01 | | | |

| Surface # | 7 | 8 | 9 | 10 | 11 |
|---|---|---|---|---|---|
| k = | −6.3823E+00 | −1.0000E+00 | −1.0000E+01 | −5.8973E−01 | −8.0076E−01 |
| A4 = | 1.3713E−02 | −2.1767E−02 | −1.4164E−01 | −2.6532E−01 | −1.7669E−01 |
| A6 = | 5.6619E−02 | 2.5524E−02 | 1.1626E−01 | 4.5104E−02 | 5.7785E−02 |
| A8 = | −1.1087E−01 | −7.3990E−02 | −5.1717E−02 | 1.4261E−02 | −1.7371E−02 |
| A10 = | −1.4047E−02 | 6.5783E−02 | 9.2580E−03 | −4.0166E−03 | 3.4365E−03 |
| A12 = | 1.5838E−01 | −3.6985E−02 | 6.1947E−04 | −1.2517E−04 | −3.9952E−04 |
| A14 = | −8.2604E−02 | 8.8002E−03 | −3.3838E−04 | 5.7627E−05 | 2.0098E−05 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 2A:
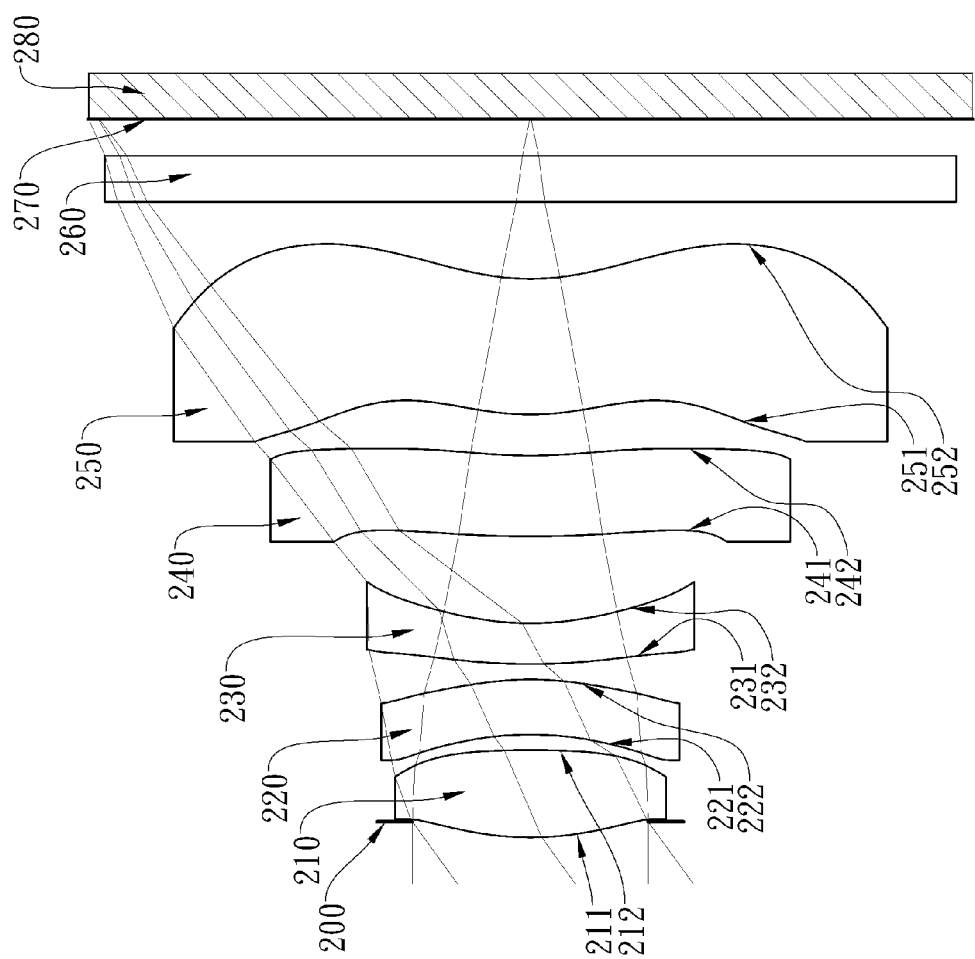
FIG. 2A is a schematic view of an image capturing lens system according to the 2nd embodiment of the present disclosure.
Figure 2B:
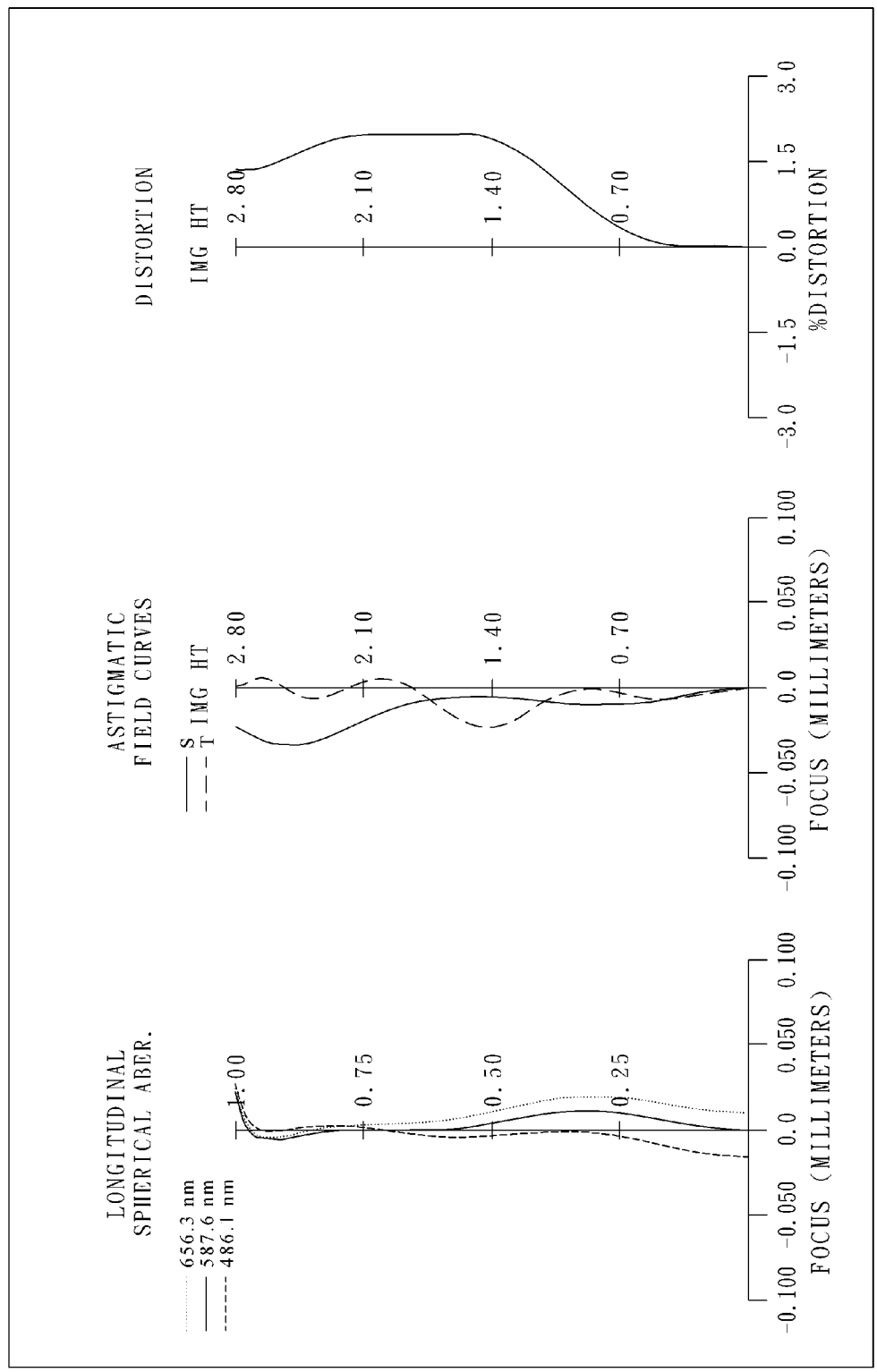
FIG. 2B shows spherical aberration curves, astigmatic field curves and a distortion curve of the image capturing lens system according to the 2nd embodiment.

FIG. 2A is a schematic view of an image capturing lens system according to the 2nd embodiment of the present disclosure. FIG. 2B shows spherical aberration curves, astigmatic field curves and a distortion curve of the image capturing lens system according to the 2nd embodiment. In FIG. 2A, the image capturing lens system includes five lens elements with refractive power, in order from an object side to an image side, an aperture stop 200, a first lens element 210, a second lens element 220, a third lens element 230, a fourth lens element 240, a fifth lens element 250, an IR-cut filter 260, image plane 270 and an image sensor 280.

The first lens element 210 with positive refractive power has a convex object-side surface 211 in a paraxial region thereof and a convex image-side surface 212 in a paraxial region thereof. The first lens element 210 is made of plastic material and has the object-side surface 211 and the image-side surface 212 being aspheric.

The second lens element 220 with positive refractive power has a concave object-side surface 221 in a paraxial region thereof and a convex image-side surface 222 in a paraxial region thereof. The second lens element 220 is made of plastic material and has the object-side surface 221 and the image-side surface 222 being aspheric.

The third lens element 230 with negative refractive power has a convex object-side surface 231 in a paraxial region thereof and a concave image-side surface 232 in a paraxial region thereof. The third lens element 230 is made of plastic material and has the object-side surface 231 and the image-side surface 232 being aspheric.

The fourth lens element 240 with negative refractive power has a convex object-side surface 241 in a paraxial region thereof and a concave image-side surface 242 in a paraxial region thereof, wherein both of the object-side surface 241 and the image-side surface 242 of the fourth lens element 240 have at least one inflection point. The fourth lens element 240 is made of plastic material and has the object-side surface 241 and the image-side surface 242 being aspheric.

The fifth lens element 250 with positive refractive power has a convex object-side surface 251 in a paraxial region thereof and a concave image-side surface 252 in a paraxial region thereof, wherein the image-side surface 252 of the fifth lens element 250 has at least one inflection point. The fifth lens element 250 is made of plastic material and has the object-side surface 251 and the image-side surface 252 being aspheric.

The third lens element 230 has the minimum central thickness among all lens elements of the image capturing lens system. The aforementioned image capturing lens system further includes an aperture stop 200, which is disposed between an imaged object and the first lens element 210, wherein the aperture stop 200 is closer to the image side of the image capturing lens system than the axial vertex on the object-side surface 211 of the first lens element 210. The IR-cut filter 260 is made of glass material located between the fifth lens element 250 and the image plane 270, and will not affect the focal length of the image capturing lens system. The image capturing lens system further includes an image sensor 280 located on the image plane 270.

The detailed optical data of the 2nd embodiment are shown in Table 3 and the aspheric surface data are shown in Table 4 below.

In the image capturing lens system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following conditions:

| 2nd Embodiment | | | |
|---|---|---|---|
| f [mm] | 3.82 | f/R8 | 1.24 |
| Fno | 2.50 | f1/f2 | 0.18 |
| HFOV [deg.] | 35.9 | f1/f3 | −0.55 |
| V3 | 21.4 | $\|f1/f4\| + \|f1/f5\|$ | 0.38 |
| CT2/CT1 | 0.63 | $(\|SAG41\| + \|SAG42\|)/CT4$ | 0.11 |
| CTmin/T34 | 0.47 | Yc51 | 0.81 |
| R3/R2 | 0.30 | Yc52 | 1.33 |
| $\|(R3 − R4)/(R3 + R4)\|$ | 0.06 | Sc52/CT5 | 0.26 |

TABLE 3

2nd Embodiment
f = 3.82 mm, Fno = 2.50, HFOV = 35.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.100 | | | | |
| 2 | Lens 1 | 1.974 | ASP | 0.566 | Plastic | 1.544 | 55.9 | 2.94 |
| 3 | | −7.569 | ASP | 0.100 | | | | |
| 4 | Lens 2 | −2.244 | ASP | 0.358 | Plastic | 1.640 | 23.3 | 16.73 |
| 5 | | −1.970 | ASP | 0.100 | | | | |
| 6 | Lens 3 | 4.325 | ASP | 0.264 | Plastic | 1.650 | 21.4 | −5.39 |
| 7 | | 1.888 | ASP | 0.563 | | | | |
| 8 | Lens 4 | 6.437 | ASP | 0.524 | Plastic | 1.530 | 55.8 | −11.78 |
| 9 | | 3.080 | ASP | 0.267 | | | | |
| 10 | Lens 5 | 1.632 | ASP | 0.879 | Plastic | 1.535 | 55.7 | 22.19 |
| 11 | | 1.538 | ASP | 0.500 | | | | |
| 12 | IR-cut filter | Plano | | 0.300 | Glass | 1.517 | 64.2 | — |
| 13 | | Plano | | 0.235 | | | | |
| 14 | Image | Plano | | — | | | | |

Note:
Reference wavelength is 587.6 nm (d-line).

TABLE 4

| Aspheric Coefficients | | | | | |
|---|---|---|---|---|---|
| Surface # | 2 | 3 | 4 | 5 | 6 |
| k = | −3.2128E+00 | −1.0000E+00 | 4.7140E+00 | 2.7851E−01 | −7.0121E−01 |
| A4 = | −1.0947E−02 | −2.0657E−01 | −3.9139E−02 | 1.7220E−01 | 1.7596E−02 |
| A6 = | 4.1866E−02 | −9.1089E−02 | 3.2752E−01 | 1.1475E−01 | −5.2832E−03 |
| A8 = | −4.0302E−01 | 8.8187E−01 | 1.9975E−01 | −4.3344E−01 | −2.4984E−01 |
| A10 = | 6.3384E−01 | −2.0878E+00 | −1.4284E+00 | 2.2880E−01 | 2.7943E−01 |
| A12 = | −5.0798E−01 | 1.6257E+00 | 1.3379E+00 | 4.0452E−02 | −7.5201E−02 |
| A14 = | −2.9605E−02 | −2.6680E−01 | | | |

| Surface # | 7 | 8 | 9 | 10 | 11 |
|---|---|---|---|---|---|
| k = | −6.2164E+00 | −1.0000E+00 | −1.0000E+01 | −1.4630E+00 | −8.1118E−01 |
| A4 = | −1.4894E−02 | −3.9036E−02 | −1.8798E−01 | −2.7911E−01 | −1.8074E−01 |
| A6 = | 8.3736E−02 | 3.6838E−02 | 1.4859E−01 | 4.9914E−02 | 5.5222E−02 |
| A8 = | −1.0249E−01 | −6.7145E−02 | −5.8760E−02 | 1.2857E−02 | −1.5819E−02 |
| A10 = | −2.8949E−02 | 5.6836E−02 | 9.0031E−03 | −3.4909E−03 | 3.1924E−03 |
| A12 = | 1.6974E−01 | −3.1027E−02 | 8.5157E−04 | −1.1600E−04 | −3.9272E−04 |
| A14 = | −8.1199E−02 | 6.0010E−03 | −3.4542E−04 | 3.4856E−05 | 2.0669E−05 |

3rd Embodiment

Figure 3A:
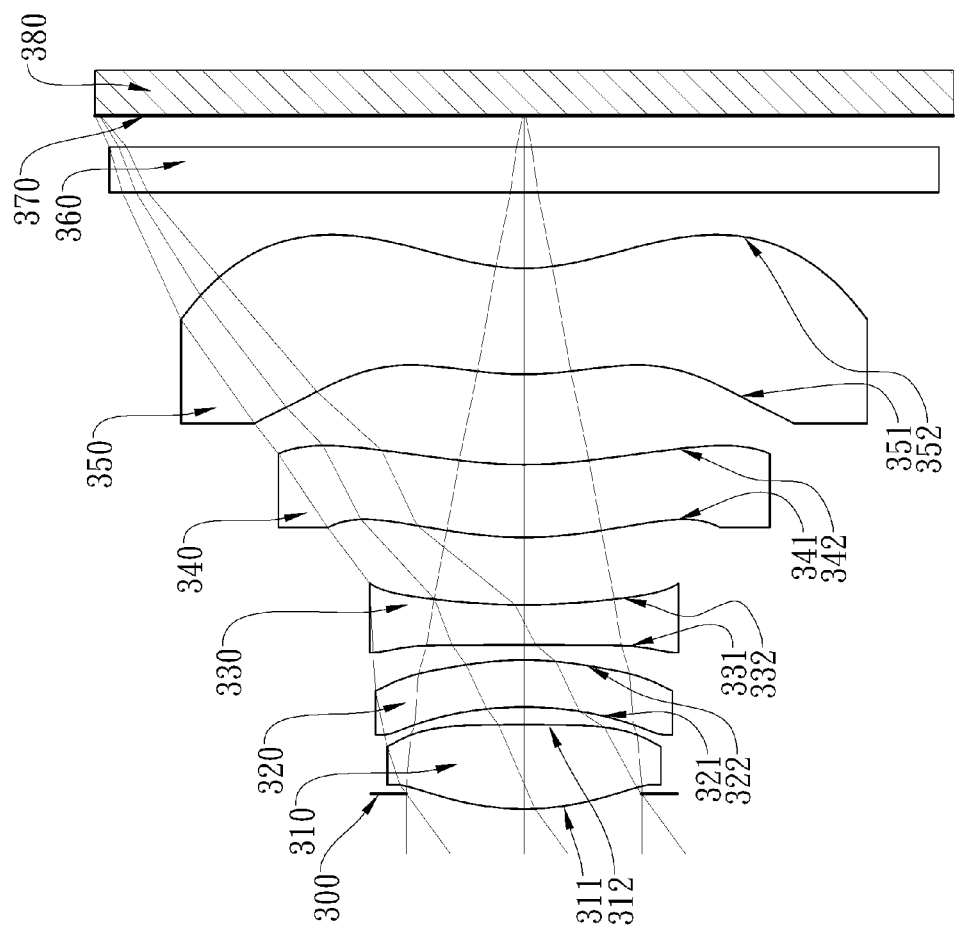
FIG. 3A is a schematic view of an image capturing lens system according to the 3rd embodiment of the present disclosure.
Figure 3B:
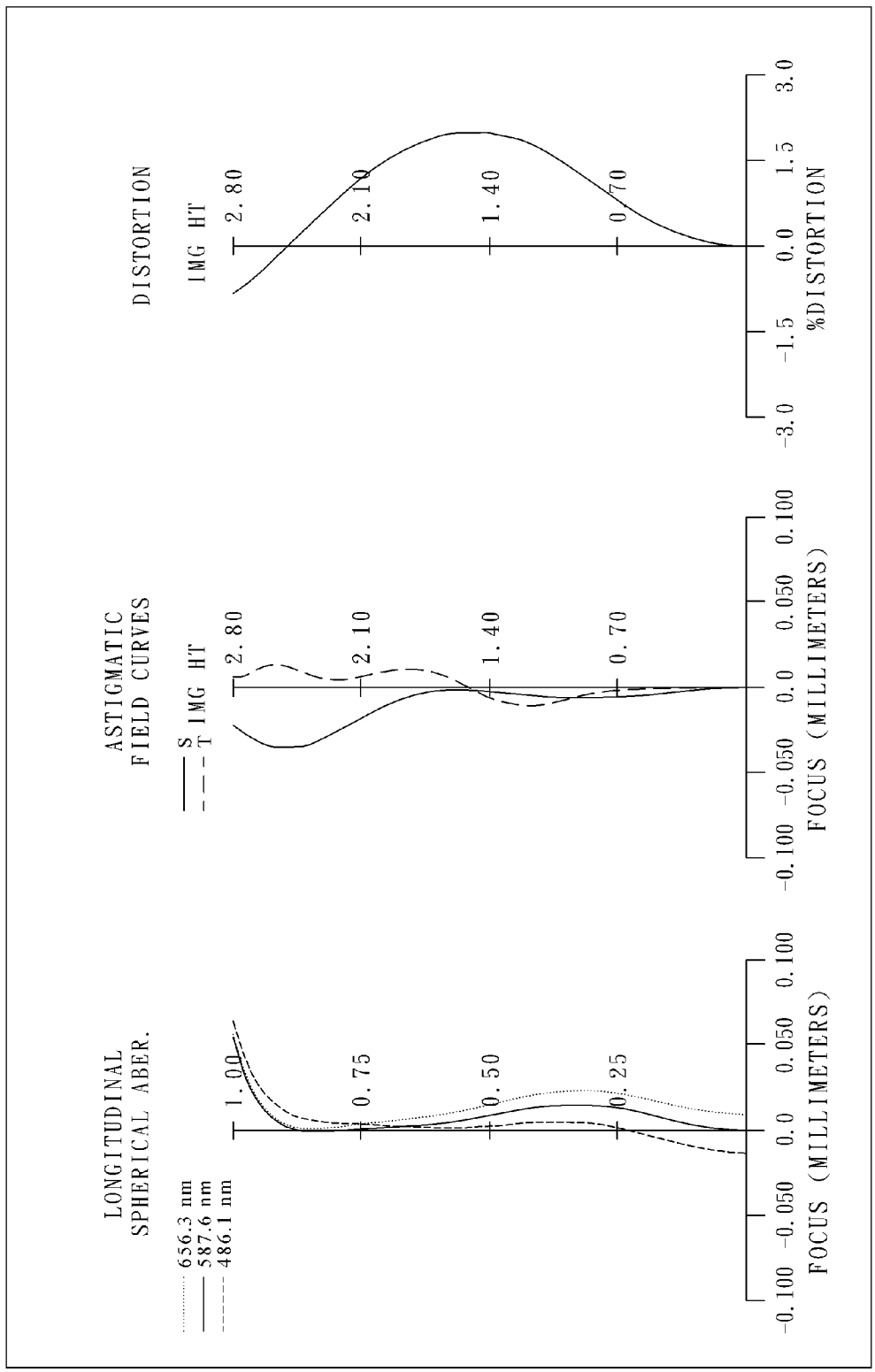
FIG. 3B shows spherical aberration curves, astigmatic field curves and a distortion curve of the image capturing lens system according to the 3rd embodiment.

FIG. 3A is a schematic view of an image capturing lens system according to the 3rd embodiment of the present disclosure. FIG. 3B shows spherical aberration curves, astigmatic field curves and a distortion curve of the image capturing lens system according to the 3rd embodiment. In FIG. 3A, the image capturing lens system includes five lens elements with refractive power, in order from an object side to an image side, an aperture stop 300, a first lens element 310, a second lens element 320, a third lens element 330, a fourth lens element 340, a fifth lens element 350, an IR-cut filter 360, image plane 370 and an image sensor 380.

The first lens element 310 with positive refractive power has a convex object-side surface 311 in a paraxial region thereof and a convex image-side surface 312 in a paraxial region thereof. The first lens element 310 is made of plastic material and has the object-side surface 311 and the image-side surface 312 being aspheric.

The second lens element 320 with positive refractive power has a concave object-side surface 321 in a paraxial region thereof and a convex image-side surface 322 in a paraxial region thereof. The second lens element 320 is made of plastic material and has the object-side surface 321 and the image-side surface 322 being aspheric.

The third lens element 330 with negative refractive power has a concave object-side surface 331 in a paraxial region thereof and a concave image-side surface 332 in a paraxial region thereof. The third lens element 330 is made of plastic material and has the object-side surface 331 and the image-side surface 332 being aspheric.

The fourth lens element 340 with positive refractive power has a convex object-side surface 341 in a paraxial region thereof and a concave image-side surface 342 in a paraxial region thereof, wherein both of the object-side surface 341 and the image-side surface 342 of the fourth lens element 340 have at least one inflection point. The fourth lens element 340 is made of plastic material and has the object-side surface 341 and the image-side surface 342 being aspheric.

The fifth lens element 350 with negative refractive power has a convex object-side surface 351 in a paraxial region thereof and a concave image-side surface 352 in a paraxial region thereof, wherein the image-side surface 352 of the fifth lens element 350 has at least one inflection point. The fifth lens element 350 is made of plastic material and has the object-side surface 351 and the image-side surface 352 being aspheric.

The third lens element 330 has the minimum central thickness among all lens elements of the image capturing lens system. The aforementioned image capturing lens system further includes an aperture stop 300, which is disposed between an imaged object and the first lens element 310, wherein the aperture stop 300 is closer to the image side of the image capturing lens system than the axial vertex on the object-side surface 311 of the first lens element 310. The IR-cut filter 360 is made of glass material located between the fifth lens element 350 and the image plane 370, and will not affect the focal length of the image capturing lens system. The image capturing lens system further includes an image sensor 380 located on the image plane 370.

The detailed optical data of the 3rd embodiment are shown in Table 5 and the aspheric surface data are shown in Table 6 below.

TABLE 5

3rd Embodiment
f = 3.88 mm, Fno = 2.50, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.100 | | | | |
| 2 | Lens 1 | 1.741 | ASP | 0.557 | Plastic | 1.544 | 55.9 | 3.12 |
| 3 | | −61.335 | ASP | 0.116 | | | | |
| 4 | Lens 2 | −2.466 | ASP | 0.310 | Plastic | 1.634 | 23.8 | 16.98 |
| 5 | | −2.104 | ASP | 0.100 | | | | |
| 6 | Lens 3 | −18.868 | ASP | 0.265 | Plastic | 1.650 | 21.4 | −5.42 |
| 7 | | 4.353 | ASP | 0.445 | | | | |
| 8 | Lens 4 | 2.474 | ASP | 0.480 | Plastic | 1.530 | 55.8 | 27.87 |
| 9 | | 2.772 | ASP | 0.597 | | | | |
| 10 | Lens 5 | 2.195 | ASP | 0.700 | Plastic | 1.535 | 55.7 | −11.26 |
| 11 | | 1.430 | ASP | 0.500 | | | | |
| 12 | IR-cut filter | Plano | | 0.300 | Glass | 1.517 | 64.2 | — |
| 13 | | Plano | | 0.206 | | | | |
| 14 | Image | Plano | | — | | | | |

Note:
Reference wavelength is 587.6 nm (d-line).

TABLE 6

Aspheric Coefficients

| | Surface # | | | | |
|---|---|---|---|---|---|
| | 2 | 3 | 4 | 5 | 6 |
| k = | −2.4453E+00 | −1.0000E+00 | 5.6177E+00 | 7.5879E−01 | −1.5000E+01 |
| A4 = | 2.6148E−03 | −1.9374E−01 | −6.8543E−02 | 1.6607E−01 | 1.1211E−01 |
| A6 = | 6.7454E−02 | −1.5519E−01 | 2.7210E−01 | 1.2012E−01 | −1.1545E−01 |

TABLE 6-continued

| Aspheric Coefficients | | | | | |
|---|---|---|---|---|---|
| A8 = | −4.0649E−01 | 8.6949E−01 | 2.8104E−01 | −5.2587E−01 | −2.7913E−01 |
| A10 = | 5.9576E−01 | −1.8553E+00 | −1.4269E+00 | 2.3286E−01 | 2.7945E−01 |
| A12 = | −4.2755E−01 | 1.4329E+00 | 1.2075E+00 | 6.2874E−02 | −2.1689E−02 |
| A14 = | −2.9605E−02 | −2.6680E−01 | | | |

| | Surface # | | | | |
|---|---|---|---|---|---|
| | 7 | 8 | 9 | 10 | 11 |
| k = | −1.5000E+01 | −1.0000E+00 | 1.0705E+00 | −4.4645E−01 | −8.3162E−01 |
| A4 = | −2.8887E−02 | −1.2097E−01 | −1.6065E−01 | −2.4291E−01 | −2.1549E−01 |
| A6 = | 9.1293E−02 | 8.8751E−02 | 1.1457E−01 | 2.8660E−02 | 7.1212E−02 |
| A8 = | −1.2598E−01 | −7.9390E−02 | −5.6335E−02 | 1.3594E−02 | −1.9868E−02 |
| A10 = | −1.4926E−02 | 4.1320E−02 | 9.9183E−03 | −3.1274E−03 | 3.4970E−03 |
| A12 = | 2.1114E−01 | −1.9357E−02 | 7.9241E−04 | −4.9431E−05 | −3.5292E−04 |
| A14 = | −1.0165E−01 | 4.2234E−03 | −3.8292E−04 | 2.3963E−05 | 1.5457E−05 |

In the image capturing lens system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

| 3rd Embodiment | | | |
|---|---|---|---|
| f [mm] | 3.88 | f/R8 | 1.40 |
| Fno | 2.50 | f1/f2 | 0.18 |
| HFOV [deg.] | 36.0 | f1/f3 | −0.58 |
| V3 | 21.4 | |f1/f4| + |f1/f5| | 0.39 |
| CT2/CT1 | 0.56 | (|SAG41| + |SAG42|)/CT4 | 0.28 |
| CTmin/T34 | 0.60 | Yc51 | 0.75 |
| R3/R2 | 0.04 | Yc52 | 1.27 |
| |(R3 − R4)/(R3 + R4)| | 0.08 | Sc52/CT5 | 0.31 |

4th Embodiment

Figure 4B:
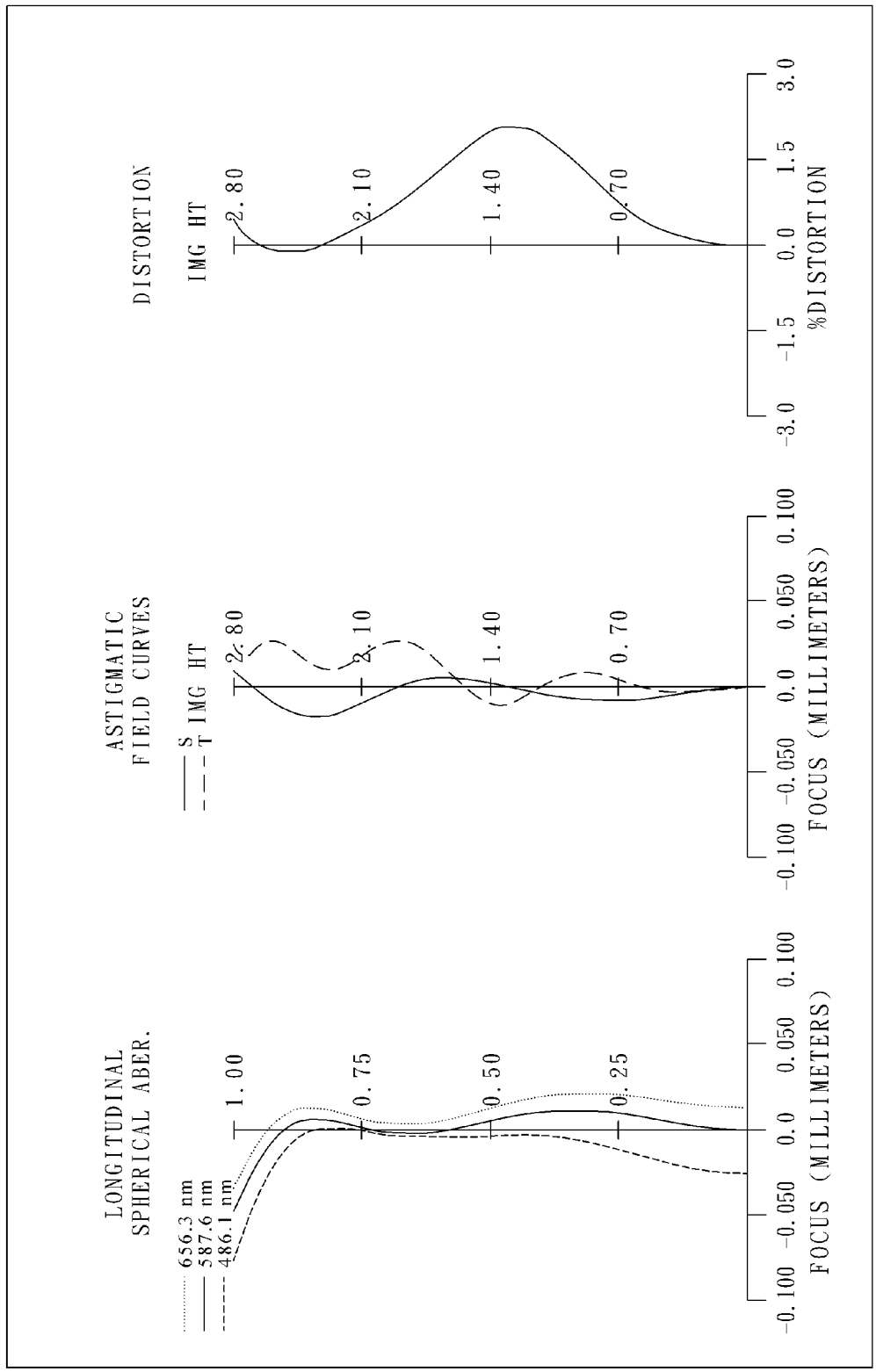
FIG. 4B shows spherical aberration curves, astigmatic field curves and a distortion curve of the image capturing lens system according to the 4th embodiment.

FIG. 4A is a schematic view of an image capturing lens system according to the 4th embodiment of the present disclosure. FIG. 4B shows spherical aberration curves, astigmatic field curves and a distortion curve of the image capturing lens system according to the 4th embodiment. In FIG. 4A, the image capturing lens system includes five lens elements with refractive power, in order from an object side to an image side, a first lens element 410, an aperture stop 400, a second lens element 420, a third lens element 430, a fourth lens element 440, a fifth lens element 450, an IR-cut filter 460, image plane 470 and an image sensor 480.

The first lens element 410 with positive refractive power has a convex object-side surface 411 in a paraxial region thereof and a concave image-side surface 412 in a paraxial region thereof. The first lens element 410 is made of plastic material and has the object-side surface 411 and the image-side surface 412 being aspheric.

The second lens element 420 with positive refractive power has a concave object-side surface 421 in a paraxial region thereof and a convex image-side surface 422 in a paraxial region thereof. The second lens element 420 is made of plastic material and has the object-side surface 421 and the image-side surface 422 being aspheric.

The third lens element 430 with negative refractive power has a convex object-side surface 431 in a paraxial region thereof and a concave image-side surface 432 in a paraxial region thereof. The third lens element 430 is made of plastic material and has the object-side surface 431 and the image-side surface 432 being aspheric.

The fourth lens element 440 with positive refractive power has a convex object-side surface 441 in a paraxial region thereof and a concave image-side surface 442 in a paraxial region thereof, wherein both of the object-side surface 441 and the image-side surface 442 of the fourth lens element 440 have at least one inflection point. The fourth lens element 440 is made of plastic material and has the object-side surface 441 and the image-side surface 442 being aspheric.

The fifth lens element 450 with negative refractive power has a convex object-side surface 451 in a paraxial region thereof and a concave image-side surface 452 in a paraxial region thereof, wherein the image-side surface 452 of the fifth lens element 450 has at least one inflection point. The fifth lens element 450 is made of plastic material and has the object-side surface 451 and the image-side surface 452 being aspheric.

The second lens element 420 and the third lens element 430 have the minimum central thickness among all lens elements of the image capturing lens system. The aforementioned image capturing lens system further includes an aperture stop 400, which is disposed between the first lens element 410 and the second lens element 420. The IR-cut filter 460 is made of glass material located between the fifth lens element 450 and the image plane 470, and will not affect the focal length of the image capturing lens system. The image capturing lens system further includes an image sensor 480 located on the image plane 470.

The detailed optical data of the 4th embodiment are shown in Table 7 and the aspheric surface data are shown in Table 8 below.

TABLE 7

4th Embodiment
f = 3.73 mm, Fno = 2.65, HFOV = 36.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.733 | ASP | 0.430 | Plastic | 1.544 | 55.9 | 3.36 |
| 2 | | 29.851 | ASP | −0.023 | | | | |
| 3 | Ape. Stop | Plano | | 0.075 | | | | |
| 4 | Lens 2 | −4.449 | ASP | 0.265 | Plastic | 1.650 | 21.4 | 1922.33 |
| 5 | | −4.538 | ASP | 0.100 | | | | |
| 6 | Lens 3 | 1.919 | ASP | 0.265 | Plastic | 1.650 | 21.4 | −9.64 |
| 7 | | 1.389 | ASP | 0.626 | | | | |
| 8 | Lens 4 | 9.239 | ASP | 0.473 | Plastic | 1.544 | 55.9 | 107.81 |
| 9 | | 10.768 | ASP | 0.436 | | | | |
| 10 | Lens 5 | 1.676 | ASP | 0.670 | Plastic | 1.544 | 55.9 | −57.79 |
| 11 | | 1.367 | ASP | 0.500 | | | | |
| 12 | IR-cut filter | Plano | | 0.300 | Glass | 1.517 | 64.2 | — |
| 13 | | Plano | | 0.285 | | | | |
| 14 | Image | Plano | | — | | | | |

Note:
Reference wavelength is 587.6 nm (d-line).

TABLE 8

Aspheric Coefficients

| | Surface # | | | | |
|---|---|---|---|---|---|
| | 1 | 2 | 4 | 5 | 6 |
| k = | −2.9017E+00 | −1.0000E+00 | 1.0000E+01 | 6.4894E+00 | −1.0000E+00 |
| A4 = | −2.9294E−02 | −4.2194E−01 | −9.1726E−02 | 2.2789E−01 | −7.9070E−02 |
| A6 = | −5.4082E−02 | 1.1265E−01 | 4.8417E−01 | 5.0401E−02 | −2.8845E−02 |
| A8 = | −1.9839E−01 | 1.5250E+00 | 2.2492E−01 | −5.1424E−01 | −2.9314E−01 |
| A10 = | −1.0167E−01 | −3.2149E+00 | −1.2534E+00 | 2.0546E−01 | 5.3426E−01 |
| A12 = | 3.1752E−01 | 2.0735E+00 | 9.1811E−01 | 4.8716E−02 | −4.5830E−01 |
| A14 = | −7.2238E−02 | −6.4397E−06 | | | |

| | Surface # | | | | |
|---|---|---|---|---|---|
| | 7 | 8 | 9 | 10 | 11 |
| k = | −4.3770E+00 | −1.0000E+00 | 1.0000E+01 | −1.0000E+00 | −1.0000E+00 |
| A4 = | 1.1880E−02 | −4.6578E−02 | −1.6222E−01 | −2.6675E−01 | −2.1287E−01 |
| A6 = | 3.6990E−02 | −5.9068E−03 | 1.0193E−01 | 2.5325E−01 | 6.2549E−02 |
| A8 = | −1.0312E−01 | −2.9456E−02 | −4.6542E−02 | 1.8499E−02 | −1.7148E−02 |
| A10 = | 2.5821E−02 | 5.6902E−02 | 1.1395E−02 | −3.8829E−03 | 3.3719E−03 |
| A12 = | 1.7964E−01 | −4.8857E−02 | 2.7572E−04 | −1.2181E−04 | −4.0621E−04 |
| A14 = | −1.3175E−01 | 1.3936E−02 | −6.3425E−04 | 4.7246E−05 | 2.1868E−05 |

In the image capturing lens system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 3.73 | f/R8 | 0.35 |
| Fno | 2.65 | f1/f2 | 0.002 |
| HFOV [deg.] | 36.7 | f1/f3 | −0.35 |
| V3 | 21.4 | |f1/f4| + |f1/f5| | 0.09 |
| CT2/CT1 | 0.62 | (|SAG41| + |SAG42|)/CT4 | 0.63 |
| CTmin/T34 | 0.42 | Yc51 | 0.81 |
| R3/R2 | −0.15 | Yc52 | 1.19 |
| |(R3 − R4)/(R3 + R4)| | 0.01 | Sc52/CT5 | 0.32 |

5th Embodiment

Figure 5A:
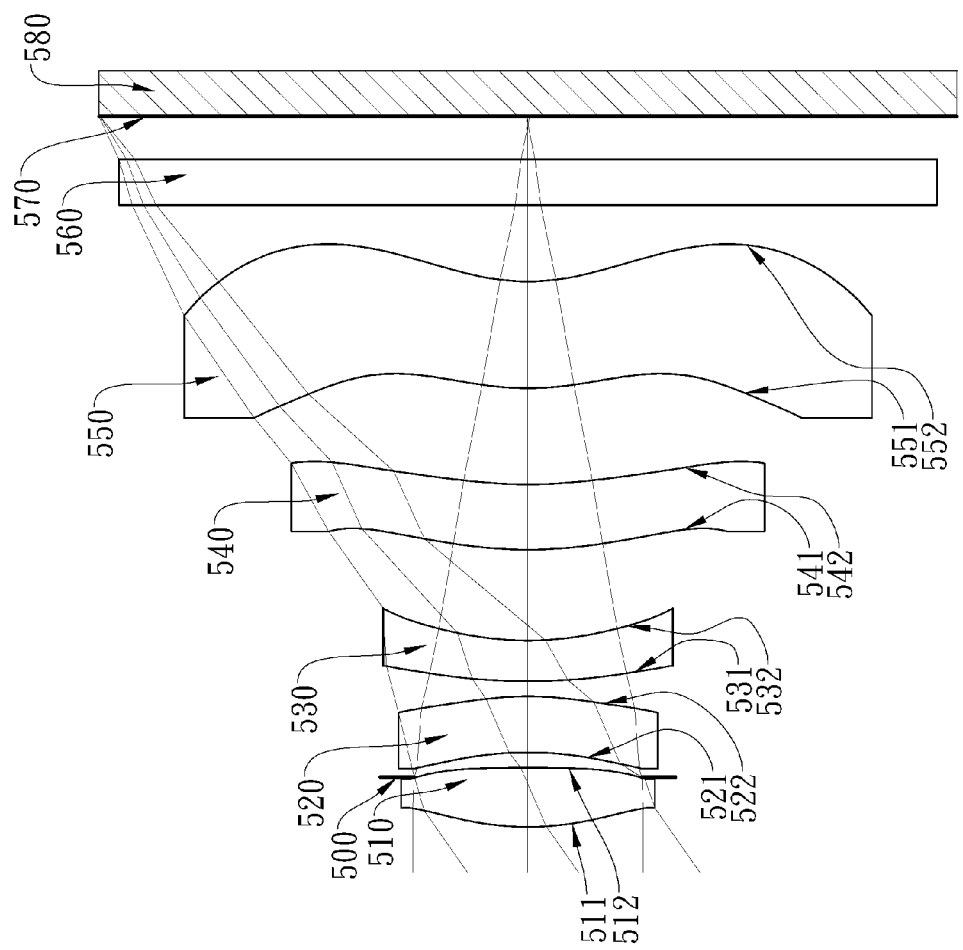
FIG. 5A is a schematic view of an image capturing lens system according to the 5th embodiment of the present disclosure.
Figure 5B:
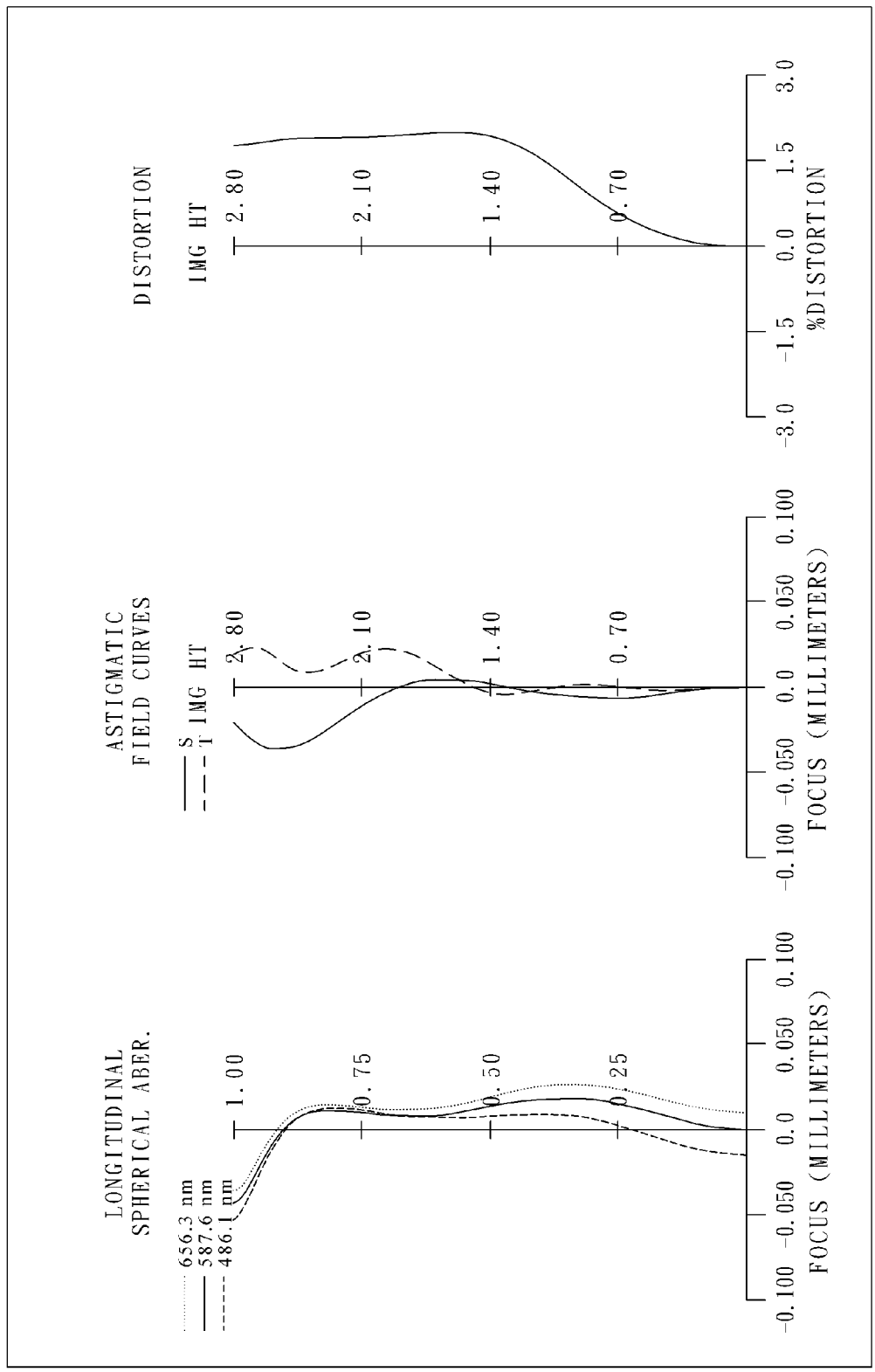
FIG. 5B shows spherical aberration curves, astigmatic field curves and a distortion curve of the image capturing lens system according to the 5th embodiment.

FIG. 5A is a schematic view of an image capturing lens system according to the 5th embodiment of the present disclosure. FIG. 5B shows spherical aberration curves, astigmatic field curves and a distortion curve of the image capturing lens system according to the 5th embodiment. In FIG. 5A, the image capturing lens system includes five lens elements with refractive power, in order from an object side to an image side, a first lens element 510, an aperture stop 500, a second lens element 520, a third lens element 530, a fourth lens element 540, a fifth lens element 550, an IR-cut filter 560, image plane 570 and an image sensor 580.

The first lens element 510 with positive refractive power has a convex object-side surface 511 in a paraxial region thereof and a convex image-side surface 512 in a paraxial region thereof. The first lens element 510 is made of plastic material and has the object-side surface 511 and the image-side surface 512 being aspheric.

The second lens element 520 with positive refractive power has a concave object-side surface 521 in a paraxial region thereof and a convex image-side surface 522 in a paraxial region thereof. The second lens element 520 is made of plastic material and has the object-side surface 521 and the image-side surface 522 being aspheric.

The third lens element 530 with negative refractive power has a convex object-side surface 531 in a paraxial region thereof and a concave image-side surface 532 in a paraxial region thereof. The third lens element 530 is made of plastic material and has the object-side surface 531 and the image-side surface 532 being aspheric.

The fourth lens element 540 with positive refractive power has a convex object-side surface 541 in a paraxial region thereof and a concave image-side surface 542 in a paraxial region thereof, wherein both of the object-side surface 541 and the image-side surface 542 of the fourth lens element 540 have at least one inflection point. The fourth lens element 540 is made of plastic material and has the object-side surface 541 and the image-side surface 542 being aspheric.

The fifth lens element 550 with negative refractive power has a convex object-side surface 551 in a paraxial region thereof and a concave image-side surface 552 in a paraxial region thereof, wherein the image-side surface 552 of the fifth lens element 550 has at least one inflection point. The fifth lens element 550 is made of plastic material and has the object-side surface 551 and the image-side surface 552 being aspheric.

The third lens element 530 has the minimum central thickness among all lens elements of the image capturing lens system. The aforementioned image capturing lens system further includes an aperture stop 500, which is disposed between the first lens element 510 and the second lens element 520. The IR-cut filter 560 is made of glass material located between the fifth lens element 550 and the image plane 570, and will not affect the focal length of the image capturing lens system. The image capturing lens system further includes an image sensor 580 located on the image plane 570.

The detailed optical data of the 5th embodiment are shown in Table 9 and the aspheric surface data are shown in Table 10 below.

TABLE 9

5th Embodiment
f = 3.92 mm, Fno = 2.60, HFOV = 35.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.832 | ASP | 0.387 | Plastic | 1.544 | 55.9 | 3.22 |
| 2 | | −36.094 | ASP | −0.060 | | | | |
| 3 | Ape. Stop | Plano | | 0.161 | | | | |
| 4 | Lens 2 | −2.418 | ASP | 0.368 | Plastic | 1.640 | 23.3 | 17.20 |
| 5 | | −2.100 | ASP | 0.100 | | | | |
| 6 | Lens 3 | 4.530 | ASP | 0.265 | Plastic | 1.650 | 21.4 | −5.50 |
| 7 | | 1.951 | ASP | 0.596 | | | | |
| 8 | Lens 4 | 2.699 | ASP | 0.428 | Plastic | 1.530 | 55.8 | 44.61 |
| 9 | | 2.880 | ASP | 0.630 | | | | |
| 10 | Lens 5 | 1.830 | ASP | 0.700 | Plastic | 1.535 | 55.7 | −22.80 |
| 11 | | 1.379 | ASP | 0.500 | | | | |
| 12 | IR-cut filter | Plano | | 0.300 | Glass | 1.517 | 64.2 | — |
| 13 | | Plano | | 0.281 | | | | |
| 14 | Image | Plano | | — | | | | |

Note:
Reference wavelength is 587.6 nm (d-line).

TABLE 10

Aspheric Coefficients

| | Surface # | | | | |
|---|---|---|---|---|---|
| | 1 | 2 | 4 | 5 | 6 |
| k = | −3.1014E+00 | −1.0000E+00 | 6.8431E+00 | −3.9023E−01 | 8.9079E+00 |
| A4 = | −1.1004E−02 | −2.2755E−01 | −4.1998E−02 | 1.9485E−01 | 3.8034E−02 |
| A6 = | 3.7853E−02 | −6.7086E−02 | 4.1685E−01 | 1.0949E−01 | 6.6605E−03 |
| A8 = | −4.3381E−01 | 9.3609E−01 | 2.3565E−01 | −4.3573E−01 | −2.6444E−01 |
| A10 = | 6.0634E−01 | −1.9020E+00 | −1.3776E+00 | 1.7780E−01 | 2.7375E−01 |
| A12 = | −4.5272E−01 | 1.3292E+00 | 1.3281E+00 | 7.0013E−02 | −6.2446E−02 |
| A14 = | −2.9834E−02 | −2.6657E−01 | | | |

TABLE 10-continued

Aspheric Coefficients

| Surface # | 7 | 8 | 9 | 10 | 11 |
|---|---|---|---|---|---|
| k = | −8.6399E+00 | −1.0000E+00 | 7.8322E−01 | −6.1912E−01 | −8.3543E−01 |
| A4 = | 1.8476E−03 | −8.9555E−02 | −1.5621E−01 | −2.2396E−01 | −2.0848E−01 |
| A6 = | 1.0134E−01 | 7.9781E−02 | 1.2974E−01 | 2.0621E−02 | 6.4930E−02 |
| A8 = | −1.0977E−01 | −7.5825E−02 | −6.1108E−02 | 1.3768E−02 | −1.8261E−02 |
| A10 = | −3.8237E−02 | 4.6667E−02 | 9.4121E−03 | −3.1570E−03 | 3.4026E−03 |
| A12 = | 1.8304E−01 | −2.3305E−02 | 9.3642E−04 | −6.0699E−05 | −3.5848E−04 |
| A14 = | −8.0437E−02 | 4.9806E−03 | −3.2235E−04 | 3.9009E−05 | 1.5405E−05 |

In the image capturing lens system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f [mm] | 3.92 | f/R8 | 1.36 |
| Fno | 2.60 | f1/f2 | 0.19 |
| HFOV [deg.] | 35.0 | f1/f3 | −0.58 |
| V3 | 21.4 | \|f1/f4\| + \|f1/f5\| | 0.21 |
| CT2/CT1 | 0.95 | (\|SAG41\| + \|SAG42\|)/CT4 | 0.60 |
| CTmin/T34 | 0.44 | Yc51 | 0.88 |
| R3/R2 | 0.07 | Yc52 | 1.32 |
| \|(R3 − R4)/(R3 + R4)\| | 0.07 | Sc52/CT5 | 0.35 |

6th Embodiment

Figure 6A:
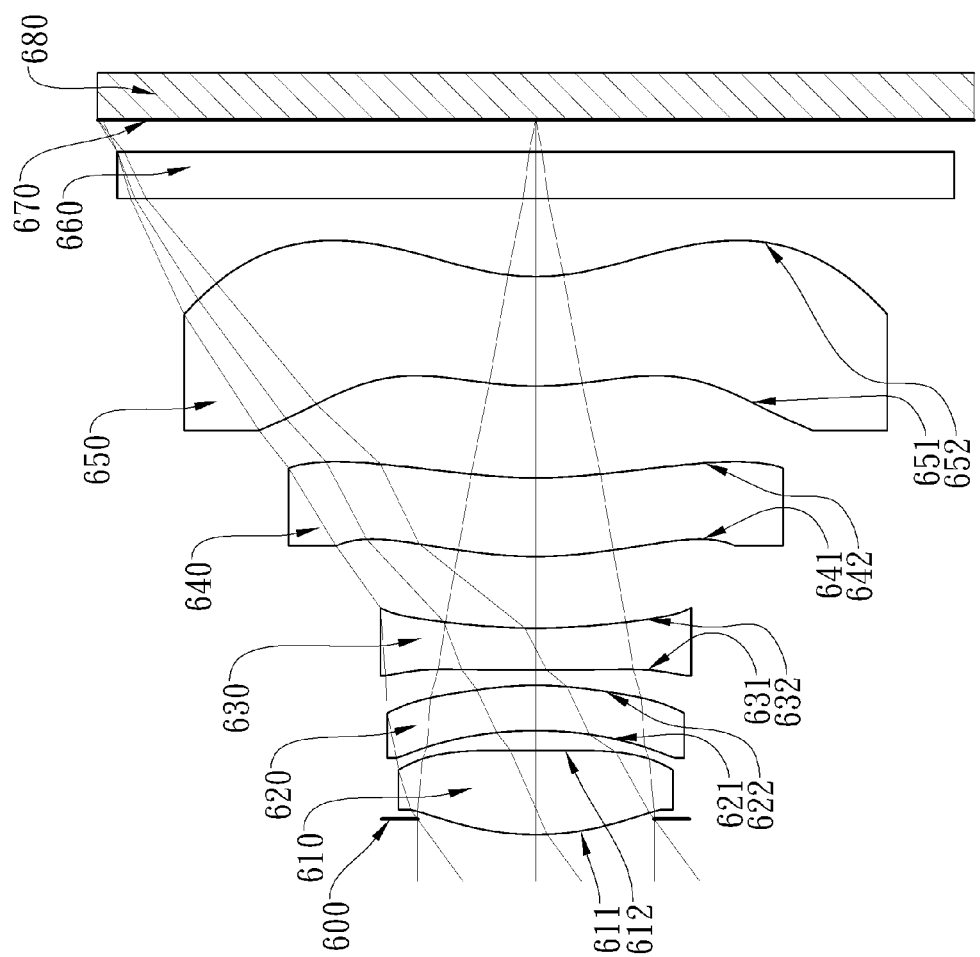
FIG. 6A is a schematic view of an image capturing lens system according to the 6th embodiment of the present disclosure.
Figure 6B:
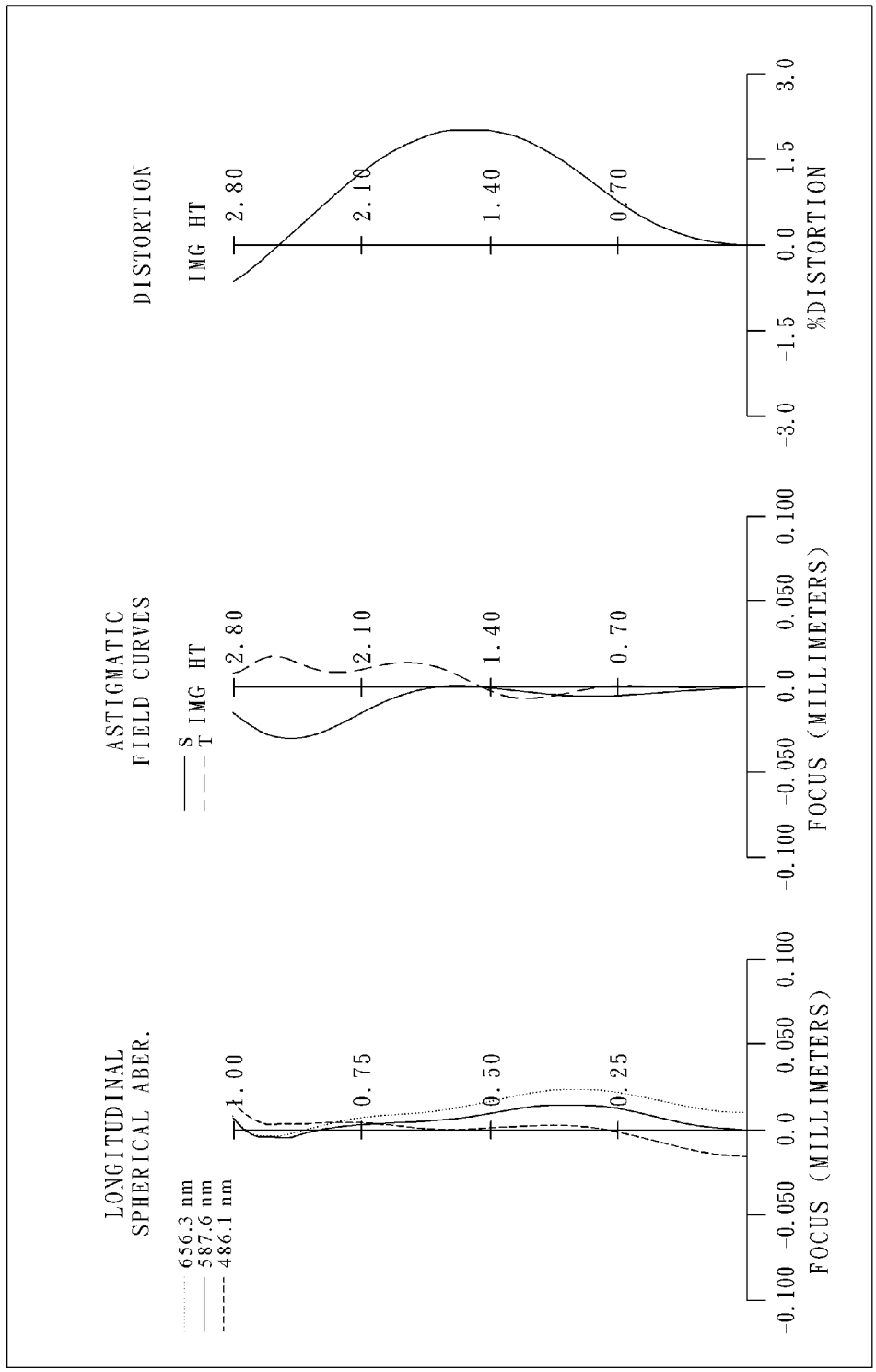
FIG. 6B shows spherical aberration curves, astigmatic field curves and a distortion curve of the image capturing lens system according to the 6th embodiment.

FIG. 6A is a schematic view of an image capturing lens system according to the 6th embodiment of the present disclosure. FIG. 6B shows spherical aberration curves, astigmatic field curves and a distortion curve of the image capturing lens system according to the 6th embodiment. In FIG. 6A, the image capturing lens system includes five lens elements with refractive power, in order from an object side to an image side, an aperture stop 600, a first lens element 610, a second lens element 620, a third lens element 630, a fourth lens element 640, a fifth lens element 650, an IR-cut filter 660, image plane 670 and an image sensor 680.

The first lens element 610 with positive refractive power has a convex object-side surface 611 in a paraxial region thereof and a concave image-side surface 612 in a paraxial region thereof. The first lens element 610 is made of plastic material and has the object-side surface 611 and the image-side surface 612 being aspheric.

The second lens element 620 with positive refractive power has a concave object-side surface 621 in a paraxial region thereof and a convex image-side surface 622 in a paraxial region thereof. The second lens element 620 is made of plastic material and has the object-side surface 621 and the image-side surface 622 being aspheric.

The third lens element 630 with negative refractive power has a concave object-side surface 631 in a paraxial region thereof and a concave image-side surface 632 in a paraxial region thereof. The third lens element 630 is made of plastic material and has the object-side surface 631 and the image-side surface 632 being aspheric.

The fourth lens element 640 with positive refractive power has a convex object-side surface 641 in a paraxial region thereof and a concave image-side surface 642 in a paraxial region thereof, wherein both of the object-side surface 641 and the image-side surface 642 of the fourth lens element 640 have at least one inflection point. The fourth lens element 640 is made of plastic material and has the object-side surface 641 and the image-side surface 642 being aspheric.

The fifth lens element 650 with negative refractive power has a convex object-side surface 651 in a paraxial region thereof and a concave image-side surface 652 in a paraxial region thereof, wherein the image-side surface 652 of the fifth lens element 650 has at least one inflection point. The fifth lens element 650 is made of plastic material and has the object-side surface 651 and the image-side surface 652 being aspheric.

The third lens element 630 has the minimum central thickness among all lens elements of the image capturing lens system. The aforementioned image capturing lens system further includes an aperture stop 600, which is disposed between an imaged object and the first lens element 610, wherein the aperture stop 600 is closer to the image side of the image capturing lens system than the axial vertex on the object-side surface 611 of the first lens element 610. The IR-cut filter 660 is made of glass material located between the fifth lens element 650 and the image plane 670, and will not affect the focal length of the image capturing lens system. The image capturing lens system further includes an image sensor 680 located on the image plane 670.

The detailed optical data of the 6th embodiment are shown in Table 11 and the aspheric surface data are shown in Table 12 below.

TABLE 11

6th Embodiment
f = 3.86 mm, Fno = 2.55, HFOV = 36.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.100 | | | | |

TABLE 11-continued

6th Embodiment
f = 3.86 mm, Fno = 2.55, HFOV = 36.1 deg.

| Surface # | | Curvature Radius | Thickness | Material | Index | Abbe # | Focal Length |
|---|---|---|---|---|---|---|---|
| 2 | Lens 1 | 1.714 ASP | 0.539 | Plastic | 1.544 | 55.9 | 3.25 |
| 3 | | 47.877 ASP | 0.126 | | | | |
| 4 | Lens 2 | −2.595 ASP | 0.290 | Plastic | 1.634 | 23.8 | 16.90 |
| 5 | | −2.180 ASP | 0.100 | | | | |
| 6 | Lens 3 | −65.360 ASP | 0.266 | Plastic | 1.650 | 21.4 | −5.66 |
| 7 | | 3.899 ASP | 0.458 | | | | |
| 8 | Lens 4 | 2.594 ASP | 0.503 | Plastic | 1.530 | 55.8 | 25.27 |
| 9 | | 3.001 ASP | 0.587 | | | | |
| 10 | Lens 5 | 2.081 ASP | 0.700 | Plastic | 1.535 | 55.7 | −12.43 |
| 11 | | 1.399 ASP | 0.500 | | | | |
| 12 | IR-cut filter | Plano | 0.300 | Glass | 1.517 | 64.2 | — |
| 13 | | Plano | 0.202 | | | | |
| 14 | Image | Plano | — | | | | |

Note:
Reference wavelength is 587.6 nm (d-line).

TABLE 12

Aspheric Coefficients

| | Surface # | | | | |
|---|---|---|---|---|---|
| | 2 | 3 | 4 | 5 | 6 |
| k = | −2.3668E+00 | −1.0000E+00 | 6.4242E+00 | 6.2034E−01 | −1.5000E+00 |
| A4 = | 3.7144E−03 | −1.9761E−01 | −7.6204E−02 | 1.6889E−01 | 1.0817E−01 |
| A6 = | 6.7368E−02 | −1.6892E−01 | 2.7373E−01 | 1.2361E−01 | −1.2078E−01 |
| A8 = | −4.0678E−01 | 8.7610E−01 | 2.8409E−01 | −5.2700E−01 | −2.8019E−01 |
| A10 = | 5.9590E−01 | −1.8511E+00 | −1.4226E+00 | 2.2688E−01 | 2.7698E−01 |
| A12 = | −4.3179E−01 | 1.4212E+00 | 1.1959E+00 | 6.1489E−02 | −1.6957E−02 |
| A14 = | −2.9605E−02 | −2.6680E−01 | | | |

| | Surface # | | | | |
|---|---|---|---|---|---|
| | 7 | 8 | 9 | 10 | 11 |
| k = | −1.5000E+01 | −1.0000E+00 | 1.4803E+00 | −4.9106E−01 | −8.4133E−01 |
| A4 = | −3.1910E−02 | −1.1713E−01 | −1.6120E−01 | −2.4438E−01 | −2.1673E−01 |
| A6 = | 8.9723E−02 | 8.6996E−02 | 1.1499E−01 | 2.8217E−02 | 7.1607E−02 |
| A8 = | −1.3128E−01 | −7.9216E−02 | −5.6002E−02 | 1.3556E−02 | −1.9895E−02 |
| A10 = | −1.5807E−02 | 4.1529E−02 | 9.9570E−03 | −3.1072E−03 | 3.5030E−03 |
| A12 = | 2.1380E−01 | −1.9179E−02 | 7.8294E−04 | −4.0597E−05 | −3.5217E−04 |
| A14 = | −9.8328E−02 | 4.2072E−03 | −3.9000E−04 | 2.6465E−05 | 1.5497E−05 |

In the image capturing lens system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f [mm] | 3.86 | f/R8 | 1.28 |
| Fno | 2.55 | f1/f2 | 0.19 |
| HFOV [deg.] | 36.1 | f1/f3 | −0.58 |
| V3 | 21.4 | \|f1/f4\| + \|f1/f5\| | 0.39 |
| CT2/CT1 | 0.54 | (\|SAG41\| + \|SAG42\|)/CT4 | 0.26 |
| CTmin/T34 | 0.58 | Yc51 | 0.77 |
| R3/R2 | −0.05 | Yc52 | 1.30 |
| \|(R3 − R4)/(R3 + R4)\| | 0.09 | Sc52/CT5 | 0.33 |

7th Embodiment

Figure 7A:
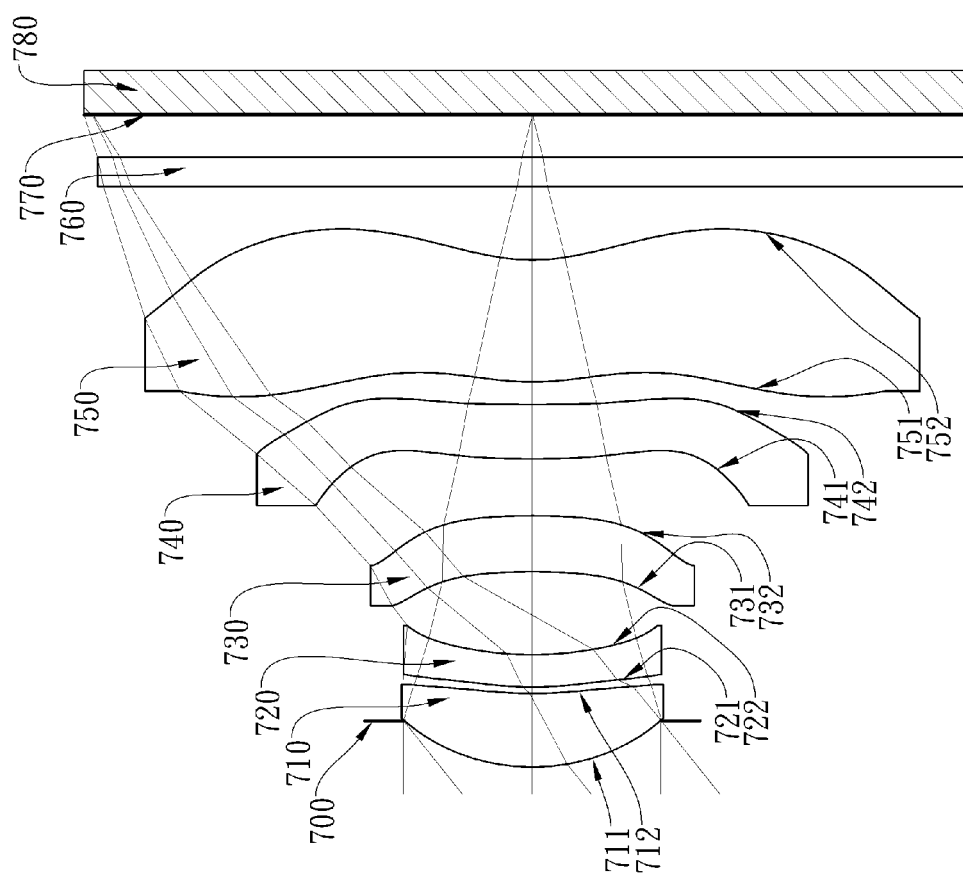
FIG. 7A is a schematic view of an image capturing lens system according to the 7th embodiment of the present disclosure.
Figure 7B:
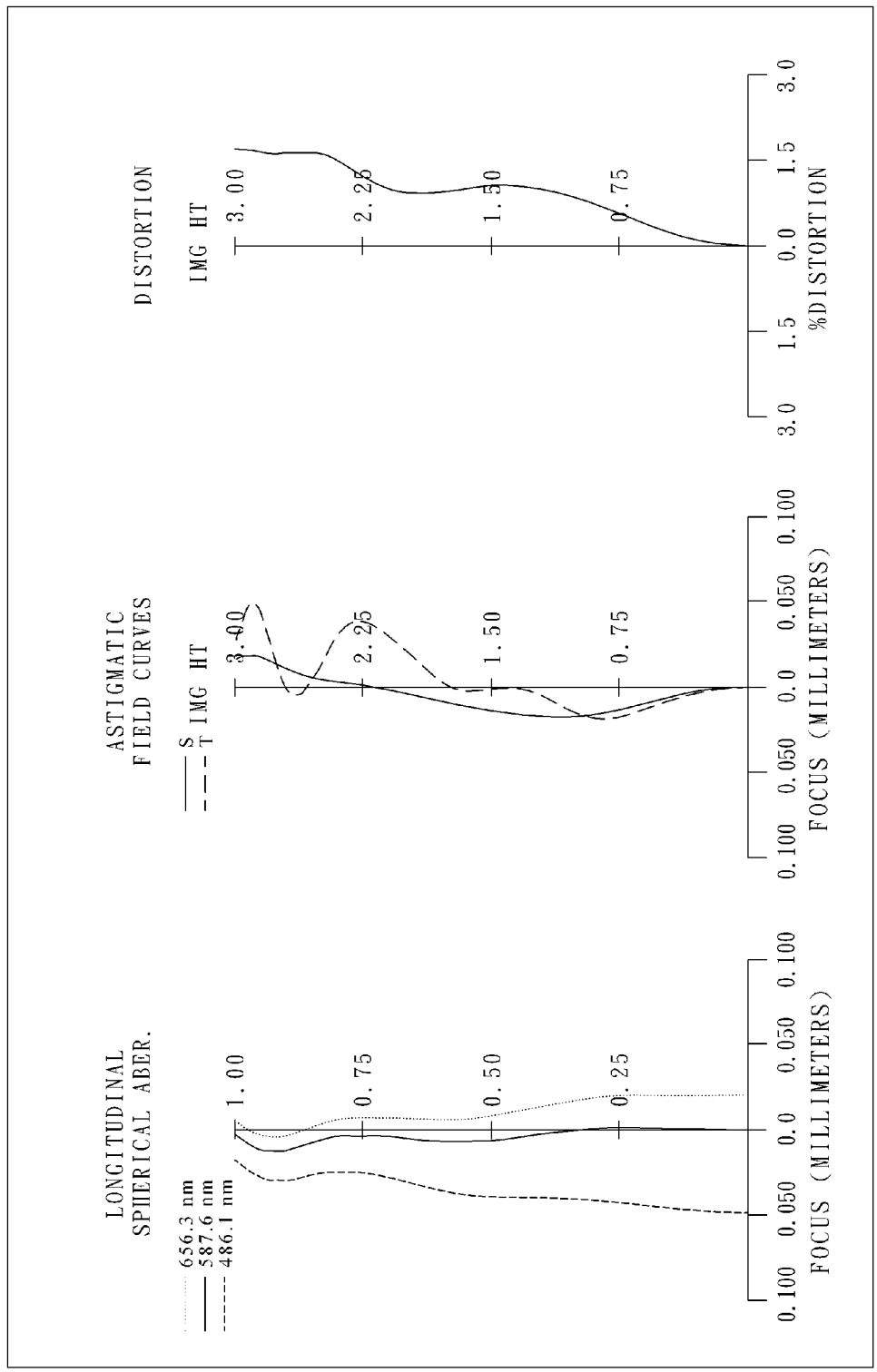
FIG. 7B shows spherical aberration curves, astigmatic field curves and a distortion curve of the image capturing lens system according to the 7th embodiment.

FIG. 7A is a schematic view of an image capturing lens system according to the 7th embodiment of the present disclosure. FIG. 7B shows spherical aberration curves, astigmatic field curves and a distortion curve of the image capturing lens system according to the 7th embodiment. In FIG. 7A, the image capturing lens system includes five lens elements with refractive power, in order from an object side to an image side, an aperture stop 700, a first lens element 710, a second lens element 720, a third lens element 730, a fourth lens element 740, a fifth lens element 750, an IR-cut filter 760, image plane 770 and an image sensor 780.

The first lens element 710 with positive refractive power has a convex object-side surface 711 in a paraxial region thereof and a concave image-side surface 712 in a paraxial region thereof. The first lens element 710 is made of plastic material and has the object-side surface 711 and the image-side surface 712 being aspheric.

The second lens element 720 with positive refractive power has a convex object-side surface 721 in a paraxial region thereof and a concave image-side surface 722 in a paraxial region thereof. The second lens element 720 is made of plastic material and has the object-side surface 721 and the image-side surface 722 being aspheric.

The third lens element 730 with negative refractive power has a concave object-side surface 731 in a paraxial region thereof and a convex image-side surface 732 in a paraxial region thereof. The third lens element 730 is made of plastic material and has the object-side surface 731 and the image-side surface 732 being aspheric.

The fourth lens element 740 with positive refractive power has a convex object-side surface 741 in a paraxial region thereof and a concave image-side surface 742 in a paraxial region thereof, wherein both of the object-side surface 741 and the image-side surface 742 of the fourth lens element 740 have at least one inflection point. The fourth lens element 740 is made of plastic material and has the object-side surface 741 and the image-side surface 742 being aspheric.

The fifth lens element 750 with negative refractive power has a convex object-side surface 751 in a paraxial region thereof and a concave image-side surface 752 in a paraxial region thereof, wherein the image-side surface 752 of the fifth lens element 750 has at least one inflection point. The fifth lens element 750 is made of plastic material and has the object-side surface 751 and the image-side surface 752 being aspheric.

The second lens element 720 has the minimum central thickness among all lens elements of the image capturing lens system. The aforementioned image capturing lens system further includes an aperture stop 700, which is disposed between an imaged object and the first lens element 710, wherein the aperture stop 700 is closer to the image side of the image capturing lens system than the axial vertex on the object-side surface 711 of the first lens element 710. The IR-cut filter 760 is made of glass material located between the fifth lens element 750 and the image plane 770, and will not affect the focal length of the image capturing lens system. The image capturing lens system further includes an image sensor 780 located on the image plane 770.

The detailed optical data of the 7th embodiment are shown in Table 13 and the aspheric surface data are shown in Table 14 below.

TABLE 13

7th Embodiment
f = 3.69 mm, Fno = 2.10, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.315 | | | | |
| 2 | Lens 1 | 1.406 | ASP | 0.501 | Plastic | 1.544 | 55.9 | 4.99 |
| 3 | | 2.551 | ASP | 0.044 | | | | |
| 4 | Lens 2 | 2.101 | ASP | 0.221 | Plastic | 1.640 | 23.3 | 34.86 |
| 5 | | 2.224 | ASP | 0.566 | | | | |
| 6 | Lens 3 | −4.571 | ASP | 0.383 | Plastic | 1.544 | 55.9 | −193.41 |
| 7 | | −4.919 | ASP | 0.388 | | | | |
| 8 | Lens 4 | 10.681 | ASP | 0.371 | Plastic | 1.614 | 25.6 | 32.30 |
| 9 | | 22.835 | ASP | 0.155 | | | | |
| 10 | Lens 5 | 1.898 | ASP | 0.833 | Plastic | 1.544 | 55.9 | −20.36 |
| 11 | | 1.370 | ASP | 0.500 | | | | |
| 12 | IR-cut filter | Plano | | 0.200 | Glass | 1.517 | 64.2 | — |
| 13 | | Plano | | 0.291 | | | | |
| 14 | Image | Plano | | — | | | | |

Note:
Reference wavelength is 587.6 nm (d-line).

TABLE 14

Aspheric Coefficients

| | Surface # | | | | |
|---|---|---|---|---|---|
| | 2 | 3 | 4 | 5 | 6 |
| k = | 1.1808E−02 | −3.0000E+01 | −9.6348E+00 | −1.8896E+00 | 5.0000E+00 |
| A4 = | −5.3040E−03 | −1.1239E−01 | −2.4428E−01 | −5.1256E−02 | −1.4147E−01 |
| A6 = | 9.8291E−02 | −1.1021E−01 | 4.8227E−02 | 1.4105E−02 | −1.6790E−01 |
| A8 = | −2.3559E−01 | 7.9431E−01 | 7.0174E−01 | 3.1081E−01 | −1.8729E−01 |
| A10 = | 3.2649E−01 | −1.3843E+00 | −1.1780E+00 | −7.6925E−02 | 2.0810E+00 |
| A12 = | −2.0223E−01 | 1.2269E+00 | 9.5289E−01 | −3.1981E−01 | −5.0691E+00 |
| A14 = | 4.4892E−02 | −4.8639E−01 | −3.7004E−01 | 3.6031E−01 | 5.2685E+00 |
| A16 = | −4.0312E−03 | | | | −1.9016E+00 |

| | Surface # | | | | |
|---|---|---|---|---|---|
| | 7 | 8 | 9 | 10 | 11 |
| k = | 8.1482E+00 | −3.0000E+01 | −3.0000E+01 | −2.5021E+00 | −4.2431E+00 |
| A4 = | −1.3621E−01 | 2.7709E−01 | 1.3326E−01 | −3.3494E−01 | −1.4531E−01 |
| A6 = | −6.3720E−02 | −5.7553E−01 | −1.7561E−01 | 2.0193E−01 | 8.4294E−02 |
| A8 = | −5.5957E−01 | 5.6228E−01 | 9.0657E−02 | −7.2025E−02 | −3.8400E−02 |

TABLE 14-continued

| Aspheric Coefficients | | | | |
|---|---|---|---|---|
| A10 = | 1.9223E+00 | −3.9055E−01 | −3.8147E−02 | 1.6717E−02 | 1.1323E−02 |
| A12 = | −2.6610E+00 | 1.5815E−01 | 1.2293E−02 | −2.4307E−03 | −1.9636E−03 |
| A14 = | 1.7440E+00 | −3.0389E−02 | −2.1619E−03 | 1.9969E−04 | 1.7944E−04 |
| A16 = | −4.2319E−01 | 1.7753E−03 | 1.4374E−04 | −7.0615E−06 | −6.6223E−06 |

In the image capturing lens system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

| 7th Embodiment | | | |
|---|---|---|---|
| f [mm] | 3.69 | f/R8 | 0.16 |
| Fno | 2.10 | f1/f2 | 0.14 |
| HFOV [deg.] | 38.7 | f1/f3 | −0.03 |
| V3 | 55.9 | \|f1/f4\| + \|f1/f5\| | 0.40 |
| CT2/CT1 | 0.44 | (\|SAG41\| + \|SAG42\|)/CT4 | 1.77 |
| CTmin/T34 | 0.57 | Yc51 | 0.78/2.01 |
| R3/R2 | 0.82 | Yc52 | 1.31 |
| \|(R3 − R4)/(R3 + R4)\| | 0.03 | Sc52/CT5 | 0.25 |

8th Embodiment

Figure 8A:
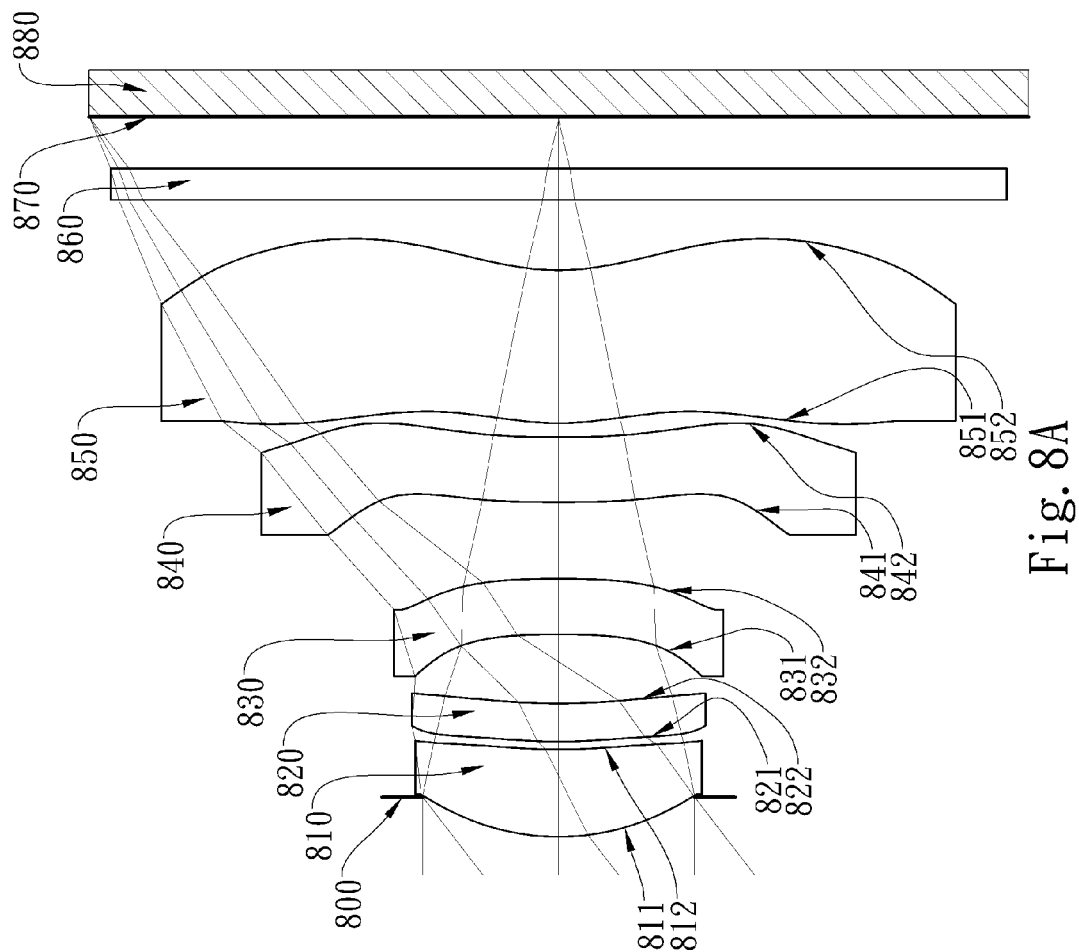
FIG. 8A is a schematic view of an image capturing lens system according to the 8th embodiment of the present disclosure.
Figure 8B:
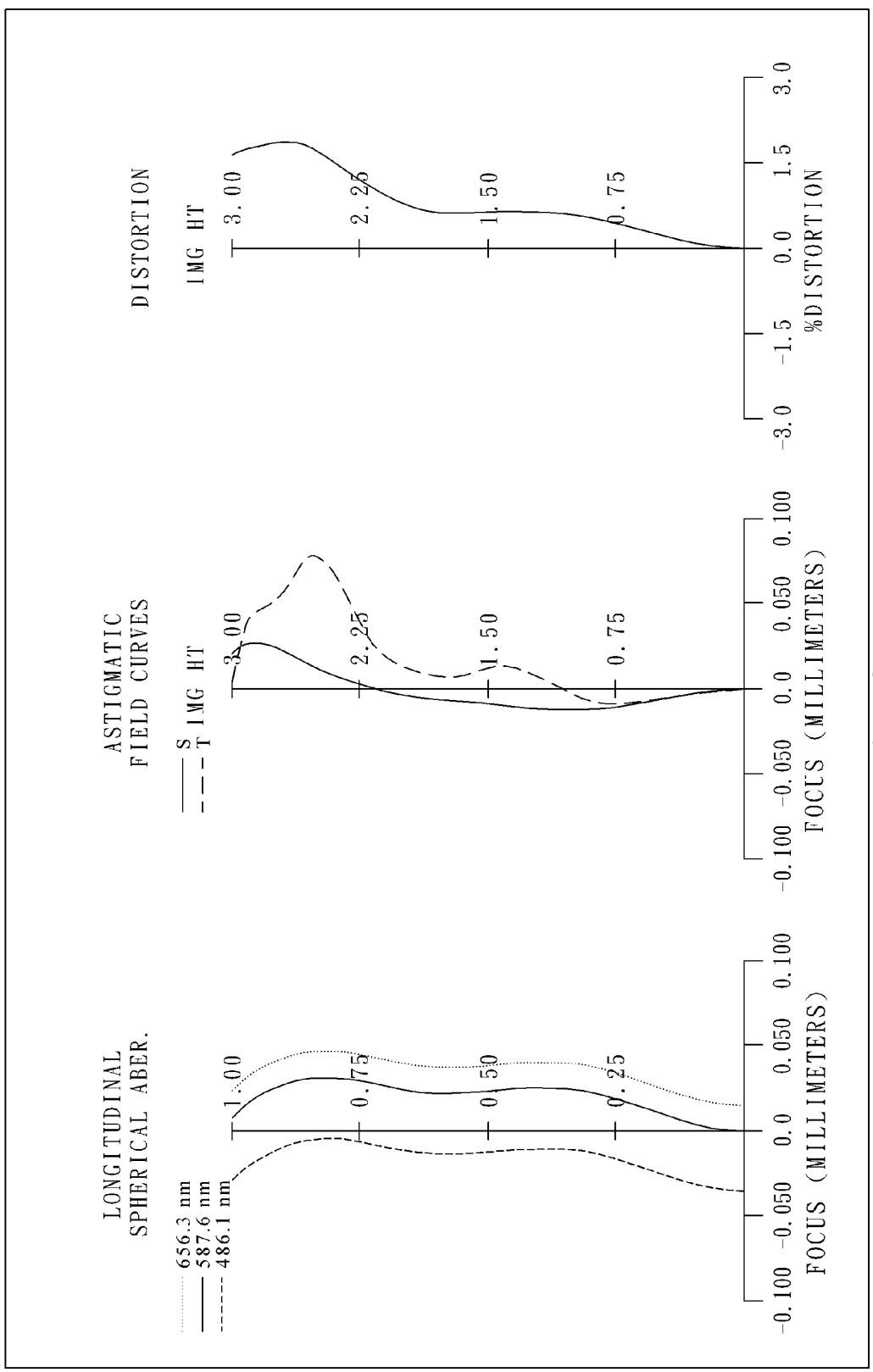
FIG. 8B shows spherical aberration curves, astigmatic field curves and a distortion curve of the image capturing lens system according to the 8th embodiment.

FIG. 8A is a schematic view of an image capturing lens system according to the 8th embodiment of the present disclosure. FIG. 8B shows spherical aberration curves, astigmatic field curves and a distortion curve of the image capturing lens system according to the 8th embodiment. In FIG. 8A, the image capturing lens system includes five lens elements with refractive power, in order from an object side to an image side, an aperture stop 800, a first lens element 810, a second lens element 820, a third lens element 830, a fourth lens element 840, a fifth lens element 850, an IR-cut filter 860, image plane 870 and an image sensor 880.

The first lens element 810 with positive refractive power has a convex object-side surface 811 in a paraxial region thereof and a concave image-side surface 812 in a paraxial region thereof. The first lens element 810 is made of plastic material and has the object-side surface 811 and the image-side surface 812 being aspheric.

The second lens element 820 with positive refractive power has a convex object-side surface 821 in a paraxial region thereof and a concave image-side surface 822 in a paraxial region thereof. The second lens element 820 is made of plastic material and has the object-side surface 821 and the image-side surface 822 being aspheric.

The third lens element 830 with negative refractive power has a concave object-side surface 831 in a paraxial region thereof and a convex image-side surface 832 in a paraxial region thereof. The third lens element 830 is made of plastic material and has the object-side surface 831 and the image-side surface 832 being aspheric.

The fourth lens element 840 with negative refractive power has a convex object-side surface 841 in a paraxial region thereof and a concave image-side surface 842 in a paraxial region thereof, wherein both of the object-side surface 841 and the image-side surface 842 of the fourth lens element 840 have at least one inflection point. The fourth lens element 840 is made of plastic material and has the object-side surface 841 and the image-side surface 842 being aspheric.

The fifth lens element 850 with positive refractive power has a convex object-side surface 851 in a paraxial region thereof and a concave image-side surface 852 in a paraxial region thereof, wherein the image-side surface 852 of the fifth lens element 850 has at least one inflection point. The fifth lens element 850 is made of plastic material and has the object-side surface 851 and the image-side surface 852 being aspheric.

The second lens element 820 has the minimum central thickness among all lens elements of the image capturing lens system. The aforementioned image capturing lens system further includes an aperture stop 800, which is disposed between an imaged object and the first lens element 810, wherein the aperture stop 800 is closer to the image side of the image capturing lens system than the axial vertex on the object-side surface 811 of the first lens element 810. The IR-cut filter 860 is made of glass material located between the fifth lens element 850 and the image plane 870, and will not affect the focal length of the image capturing lens system. The image capturing lens system further includes an image sensor 880 located on the image plane 870.

The detailed optical data of the 8th embodiment are shown in Table 15 and the aspheric surface data are shown in Table 16 below.

TABLE 15

8th Embodiment
f = 3.82 mm, Fno = 2.20, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.255 | | | | |
| 2 | Lens 1 | 1.506 | ASP | 0.559 | Plastic | 1.535 | 55.7 | 4.55 |
| 3 | | 3.434 | ASP | 0.050 | | | | |
| 4 | Lens 2 | 3.142 | ASP | 0.244 | Plastic | 1.543 | 56.5 | 28.27 |
| 5 | | 3.841 | ASP | 0.443 | | | | |
| 6 | Lens 3 | −4.936 | ASP | 0.355 | Plastic | 1.634 | 23.8 | −56.63 |
| 7 | | −5.883 | ASP | 0.490 | | | | |
| 8 | Lens 4 | 28.331 | ASP | 0.415 | Plastic | 1.583 | 30.2 | −19.10 |

TABLE 15-continued

8th Embodiment
f = 3.82 mm, Fno = 2.20, HFOV = 37.6 deg.

| Surface # | | Curvature Radius | | Thickness | Material | Index | Abbe # | Focal Length |
|---|---|---|---|---|---|---|---|---|
| 9 | | 7.954 | ASP | 0.090 | | | | |
| 10 | Lens 5 | 1.833 | ASP | 0.978 | Plastic | 1.530 | 55.8 | 3987.11 |
| 11 | | 1.495 | ASP | 0.450 | | | | |
| 12 | IR-cut filter | Plano | | 0.200 | Glass | 1.517 | 64.2 | — |
| 13 | | Plano | | 0.330 | | | | |
| 14 | Image | Plano | | — | | | | |

Note:
Reference wavelength is 587.6 nm (d-line).

TABLE 16

Aspheric Coefficients

| | Surface # | | | | |
|---|---|---|---|---|---|
| | 2 | 3 | 4 | 5 | 6 |
| k = | −1.2346E−01 | −3.0000E+01 | −4.9786E+00 | −3.7701E+00 | 5.0000E+00 |
| A4 = | −1.8157E−02 | −1.0745E−01 | −2.4470E−01 | −8.2023E−02 | −1.6085E−01 |
| A6 = | 8.2283E−02 | −1.3304E−01 | 4.6385E−02 | −4.1113E−02 | −1.9083E−01 |
| A8 = | −2.3762E−01 | 7.7007E−01 | 6.8759E−01 | 2.6691E−01 | −2.3480E−01 |
| A10 = | 3.1299E−01 | −1.3526E+00 | −1.1821E+00 | −1.5525E−01 | 2.0969E+00 |
| A12 = | −2.0931E−01 | 1.2662E+00 | 9.9409E−01 | −3.8329E−01 | −5.0537E+00 |
| A14 = | 4.3794E−02 | −4.7683E−01 | −2.9315E−01 | 3.6402E−01 | 5.2338E+00 |
| A16 = | 7.8381E−04 | | | | −1.9447E+00 |

| | Surface # | | | | |
|---|---|---|---|---|---|
| | 7 | 8 | 9 | 10 | 11 |
| k = | −1.4439E+01 | 5.0000E+00 | −9.0908E+00 | −1.6809E+00 | −3.5257E+00 |
| A4 = | −1.0917E−01 | 3.1183E−01 | 1.2505E−01 | −3.3515E−01 | −1.5152E−01 |
| A6 = | −5.2213E−02 | −5.9009E−01 | −1.6324E−01 | 2.0175E−01 | 8.5755E−02 |
| A8 = | −5.7076E−01 | 5.7072E−01 | 8.9614E−02 | −7.2080E−02 | −3.8400E−02 |
| A10 = | 1.9328E+00 | −3.9378E−01 | −3.8718E−02 | 1.6717E−02 | 1.1320E−02 |
| A12 = | −2.6397E+00 | 1.5783E−01 | 1.2240E−02 | −2.4300E−03 | −1.9632E−03 |
| A14 = | 1.7543E+00 | −3.0195E−02 | −2.1460E−03 | 1.9975E−04 | 1.7934E−04 |
| A16 = | −4.3463E−01 | 1.9712E−03 | 1.4975E−04 | −7.0999E−06 | −6.6349E−06 |

In the image capturing lens system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

| 8th Embodiment | | | |
|---|---|---|---|
| f [mm] | 3.82 | f/R8 | 0.48 |
| Fno | 2.20 | f1/f2 | 0.16 |
| HFOV [deg.] | 37.6 | f1/f3 | −0.08 |
| V3 | 23.8 | \|f1/f4\| + \|f1/f5\| | 0.24 |
| CT2/CT1 | 0.44 | (\|SAG41\| + \|SAG42\|)/CT4 | 0.75 |
| CTmin/T34 | 0.50 | Yc51 | 0.85/1.83 |
| R3/R2 | 0.91 | Yc52 | 1.32 |
| \|(R3 − R4)/(R3 + R4)\| | 0.10 | Sc52/CT5 | 0.21 |

9th Embodiment

Figure 9B:
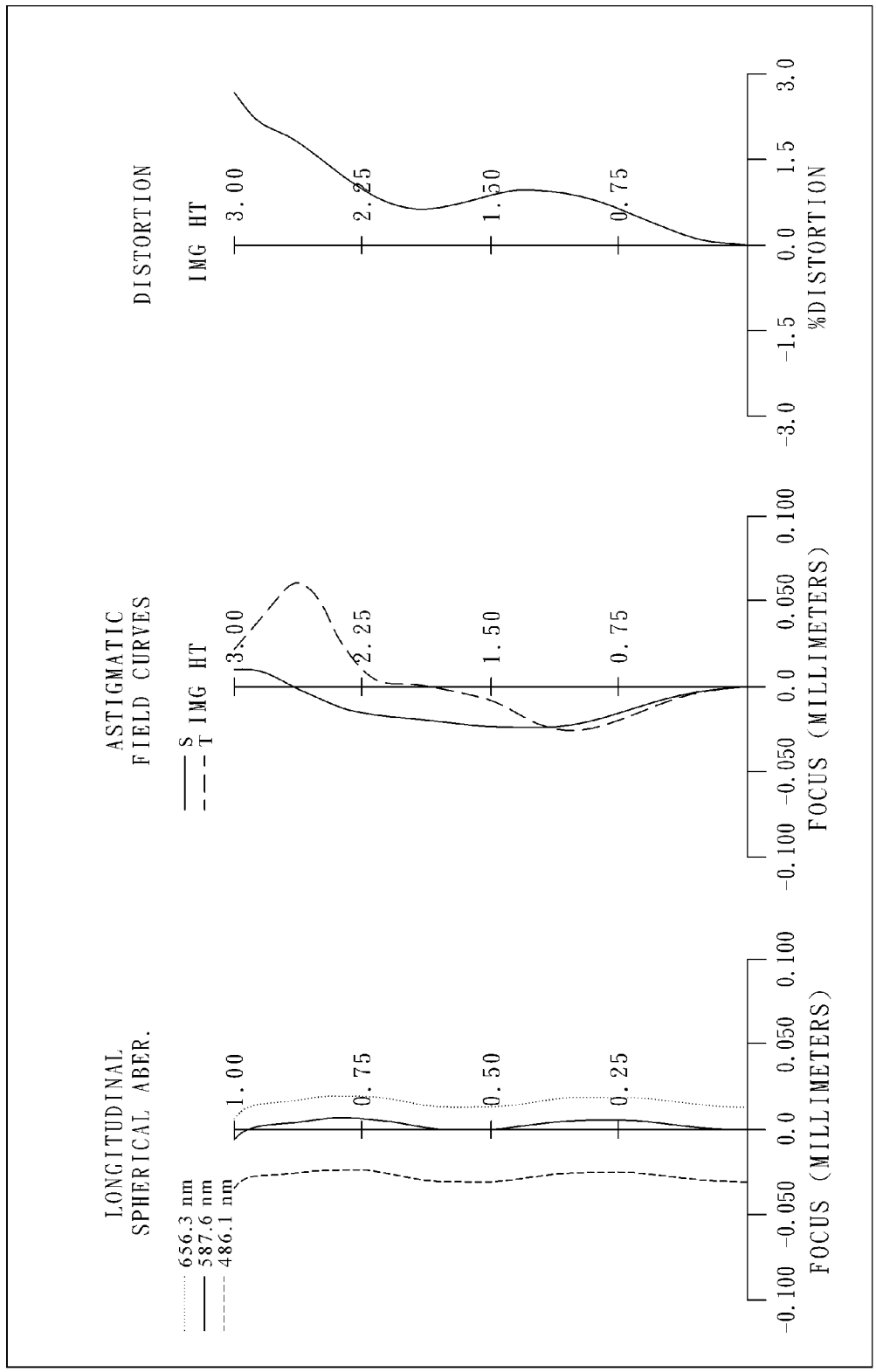
FIG. 9B shows spherical aberration curves, astigmatic field curves and a distortion curve of the image capturing lens system according to the 9th embodiment.

FIG. 9A is a schematic view of an image capturing lens system according to the 9th embodiment of the present disclosure. FIG. 9B shows spherical aberration curves, astigmatic field curves and a distortion curve of the image capturing lens system according to the 9th embodiment. In FIG. 9A, the image capturing lens system includes five lens elements with refractive power, in order from an object side to an image side, an aperture stop 900, a first lens element 910, a second lens element 920, a third lens element 930, a fourth lens element 940, a fifth lens element 950, an IR-cut filter 960, image plane 970 and an image sensor 980.

The first lens element 910 with positive refractive power has a convex object-side surface 911 in a paraxial region thereof and a concave image-side surface 912 in a paraxial region thereof. The first lens element 910 is made of plastic material and has the object-side surface 911 and the image-side surface 912 being aspheric.

The second lens element 920 with positive refractive power has a convex object-side surface 921 in a paraxial region thereof and a concave image-side surface 922 in a paraxial region thereof. The second lens element 920 is made of plastic material and has the object-side surface 921 and the image-side surface 922 being aspheric.

The third lens element 930 with negative refractive power has a concave object-side surface 931 in a paraxial region thereof and a convex image-side surface 932 in a paraxial region thereof. The third lens element 930 is made of plastic material and has the object-side surface 931 and the image-side surface 932 being aspheric.

The fourth lens element 940 with negative refractive power has a concave object-side surface 941 in a paraxial region thereof and a concave image-side surface 942 in a paraxial region thereof, wherein both of the object-side surface 941 and the image-side surface 942 of the fourth lens element 940 have at least one inflection point. The fourth lens element 940 is made of plastic material and has the object-side surface 941 and the image-side surface 942 being aspheric.

The fifth lens element 950 with positive refractive power has a convex object-side surface 951 in a paraxial region thereof and a concave image-side surface 952 in a paraxial region thereof, wherein the image-side surface 952 of the fifth lens element 950 has at least one inflection point. The fifth lens element 950 is made of plastic material and has the object-side surface 951 and the image-side surface 952 being aspheric.

The second lens element 920 has the minimum central thickness among all lens elements of the image capturing lens system. The aforementioned image capturing lens system further includes an aperture stop 900, which is disposed between an imaged object and the first lens element 910, wherein the aperture stop 900 is closer to the image side of the image capturing lens system than the axial vertex on the object-side surface 911 of the first lens element 910. The IR-cut filter 960 is made of glass material located between the fifth lens element 950 and the image plane 970, and will not affect the focal length of the image capturing lens system. The image capturing lens system further includes an image sensor 980 located on the image plane 970.

The detailed optical data of the 9th embodiment are shown in Table 17 and the aspheric surface data are shown in Table 18 below.

TABLE 17

9th Embodiment
f = 3.77 mm, Fno = 2.20, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.238 | | | | |
| 2 | Lens 1 | 1.504 | ASP | 0.463 | Plastic | 1.535 | 55.7 | 4.88 |
| 3 | | 3.166 | ASP | 0.050 | | | | |
| 4 | Lens 2 | 3.134 | ASP | 0.325 | Plastic | 1.543 | 56.5 | 16.17 |
| 5 | | 4.695 | ASP | 0.364 | | | | |
| 6 | Lens 3 | −5.923 | ASP | 0.333 | Plastic | 1.634 | 23.8 | −43.83 |
| 7 | | −7.692 | ASP | 0.476 | | | | |
| 8 | Lens 4 | −15.118 | ASP | 0.471 | Plastic | 1.632 | 23.4 | −14.08 |
| 9 | | 21.887 | ASP | 0.070 | | | | |
| 10 | Lens 5 | 1.615 | ASP | 0.899 | Plastic | 1.530 | 55.8 | 35.01 |
| 11 | | 1.428 | ASP | 0.500 | | | | |
| 12 | IR-cut filter | Plano | | 0.200 | Glass | 1.517 | 64.2 | — |
| 13 | | Plano | | 0.375 | | | | |
| 14 | Image | Plano | | — | | | | |

Note:
Reference wavelength is 587.6 nm (d-line).

TABLE 18

Aspheric Coefficients

| Surface # | | | | |
|---|---|---|---|---|
| 2 | 3 | 4 | 5 | 6 |

| | 2 | 3 | 4 | 5 | 6 |
|---|---|---|---|---|---|
| k = | −2.0228E−01 | −2.8291E+01 | −2.2991E+00 | −2.2569E+00 | 5.0000E+00 |
| A4 = | −2.1256E−02 | −1.1085E−01 | −2.4135E−01 | −8.5293E−02 | −1.6206E−01 |
| A6 = | 7.1997E−02 | −1.2551E−01 | 3.2528E−02 | −6.1774E−02 | −2.0004E−01 |
| A8 = | −2.2994E−01 | 7.6396E−01 | 6.8945E−01 | 2.2688E−01 | −2.1738E−01 |
| A10 = | 3.1591E−01 | −1.3548E+00 | −1.1797E+00 | −1.6335E−01 | 2.1188E+00 |
| A12 = | −2.2291E−01 | 1.2806E+00 | 9.9746E−01 | −3.7343E−01 | −5.0467E+00 |
| A14 = | 3.1947E−02 | −4.5754E−01 | −3.1350E−01 | 3.3901E−01 | 5.2337E+00 |
| A16 = | 2.4448E−02 | | | | −1.9352E+00 |

| Surface # | | | | |
|---|---|---|---|---|
| 7 | 8 | 9 | 10 | 11 |

| | 7 | 8 | 9 | 10 | 11 |
|---|---|---|---|---|---|
| k = | −2.3725E+00 | 2.6225E+00 | 5.0000E+00 | −1.4683E+00 | −3.3599E+00 |
| A4 = | −1.0368E−01 | 3.0938E−01 | 1.2101E−01 | −3.4105E−01 | −1.5579E−01 |
| A6 = | −3.5011E−02 | −6.0053E−01 | −1.5850E−01 | 2.0063E−01 | 8.6102E−02 |
| A8 = | −5.8122E−01 | 5.7172E−01 | 8.9516E−02 | −7.2039E−02 | −3.8465E−02 |
| A10 = | 1.9343E+00 | −3.9600E−01 | −3.8896E−02 | 1.6732E−02 | 1.1318E−02 |
| A12 = | −2.6222E+00 | 1.5674E−01 | 1.2203E−02 | −2.4296E−03 | −1.9625E−03 |
| A14 = | 1.7692E+00 | −3.0148E−02 | −2.1497E−03 | 1.9924E−04 | 1.7941E−04 |
| A16 = | −4.3698E−01 | 2.5747E−03 | 1.5022E−04 | −7.0989E−06 | −6.6425E−06 |

In the image capturing lens system according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following conditions:

| 9th Embodiment | | | |
|---|---|---|---|
| f [mm] | 3.77 | f/R8 | 0.17 |
| Fno | 2.20 | f1/f2 | 0.30 |
| HFOV [deg.] | 37.7 | f1/f3 | −0.11 |
| V3 | 23.8 | \|f1/f4\| + \|f1/f5\| | 0.49 |
| CT2/CT1 | 0.70 | (\|SAG41\| + \|SAG42\|)/CT4 | 0.83 |
| CTmin/T34 | 0.68 | Yc51 | 0.94 |
| R3/R2 | 0.99 | Yc52 | 1.30 |
| \|(R3 − R4)/(R3 + R4)\| | 0.20 | Sc52/CT5 | 0.23 |

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system comprising five lens elements with refractive power, in order from an object side to an image side:
    a first lens element with positive refractive power having a convex object-side surface;
    a second lens element having positive refractive power;
    a third lens element having negative refractive power;
    a fourth lens element with refractive power having a concave image-side surface in a paraxial region thereof, wherein an object-side surface and the image-side surface of the fourth lens element are aspheric; and
    a fifth lens element with refractive power having a concave image-side surface in a paraxial region thereof, wherein the image-side surface of the fifth lens element has at least one inflection point, and an object-side surface and the image-side surface of the fifth lens element are aspheric;
    wherein the image capturing lens system has a total of five lens elements with refractive power; and
    wherein a focal length of the first lens element is f1, a focal length of the third lens element is f3, a vertical distance between an optical axis and a critical point on the image-side surface of the fifth lens element is Yc52, a vertical distance between the optical axis and a critical point on the object-side surface of the fifth lens element is Yc51 and the following condition is satisfied:

$-1.5 < f1/f3 < 0$; and $|Yc52| > |Yc51|$.

2. The image capturing lens system of claim 1, wherein a focal length of the image capturing lens system is f, a curvature radius of the image-side surface of the fourth lens element is R8, and the following condition is satisfied:

$0 < f/R8 < 2.5$.

3. The image capturing lens system of claim 2, wherein the object-side surface of the fifth lens element is convex in a paraxial region thereof.

4. The image capturing lens system of claim 2, wherein a minimum central thickness of a lens element among all lens elements of the image capturing lens system is CTmin, an axial distance between the third lens element and the fourth lens element is T34, and the following condition is satisfied:

$0.10 < CTmin/T34 < 0.80$.

5. The image capturing lens system of claim 2, wherein the focal length of the first lens element is f1, the focal length of the third lens element is f3, and the following condition is satisfied:

$-0.8 < f1/f3 < 0$.

6. The image capturing lens system of claim 2, wherein a distance in parallel with an optical axis from an axial vertex on the image-side surface of the fifth lens element to a critical point on an image-side surface of the fifth lens element is Sc52, a central thickness of the fifth lens element is CT5, and the following condition is satisfied:

$0.05 < Sc52/CT5 < 0.70$.

7. The image capturing lens system of claim 2, further comprising:
    a stop which is disposed between an imaged object and the first lens element, wherein the stop is closer to the image side of the image capturing lens system than the axial vertex on the object-side surface of the first lens element.

8. The image capturing lens system of claim 1, wherein the focal length of the first lens element is f1, a focal length of the second lens element is f2, and the following condition is satisfied:

$0 < f1/f2 < 0.8$.

9. The image capturing lens system of claim 8, wherein the focal length of the first lens element is f1, a focal length of the fourth lens element is f4, a focal length of the fifth lens element is f5, and the following condition is satisfied:

$0 < |f1/f4| + |f1/f5| < 0.70$.

10. The image capturing lens system of claim 8, wherein an Abbe number of the third lens element is V3, and the following condition is satisfied:

$V3 < 30$.

11. The image capturing lens system of claim 8, wherein both of the object-side surface and the image-side surface of the fourth lens element have at least one inflection point, a curvature radius of the object-side surface of the second lens element is R3, a curvature radius of the image-side surface of the first lens element is R2, and the following condition is satisfied:

$0 < R3/R2 < 1.2$.

12. The image capturing lens system of claim 1, wherein the second lens element has a convex image-side surface in a paraxial region thereof.

13. The image capturing lens system of claim 12, wherein the second lens element has a concave object-side surface in a paraxial region thereof.

14. The image capturing lens system of claim , wherein a distance in parallel with an optical axis from an axial vertex on the object-side surface of the fourth lens element to a maximum effective diameter position on the object-side surface of the fourth lens element is SAG41, a distance in parallel with the optical axis from an axial vertex on the image-side surface of the fourth lens element to a maximum effective diameter position on the image-side surface of the fourth lens element is SAG42, a central thickness of the fourth lens element is CT4, and the following condition is satisfied:

(|SAG41|+|SAG42|)/CT4<0.80.

15. The image capturing lens system of claim 13, wherein a central thickness of the second lens element is CT2, a central thickness of the first lens element is CT1, and the following condition is satisfied:

0<CT2/CT1 21 1.0.

16. The image capturing lens system of claim 13, wherein a curvature radius of the object-side surface of the second lens element is R3, a curvature radius of the image-side surface of the second lens element is R4, and the following condition is satisfied:

|(R3−R4)/(R3+R4)|<0.30.

17. The image capturing lens system of claim 1, wherein the focal length of the first lens element is f1, a focal length of the second lens element is f2, and the following condition is satisfied:

0<f1/f2<0.4.

18. The image capturing lens system of claim 1, wherein the curvature radius of the object-side surface of the second lens element is R3, a curvature radius of the image-side surface of the second lens element is R4, and the following condition is satisfied:

|(R3−R4)/(R3+R4)|<0.30.

19. The image capturing lens system of claim 1, wherein a distance in parallel with an optical axis from an axial vertex on the object-side surface of the fourth lens element to a maximum effective diameter position on the object-side surface of the fourth lens element is SAG41, a distance in parallel with the optical axis from an axial vertex on the image-side surface of the fourth lens element to a maximum effective diameter position on the image-side surface of the fourth lens element is SAG42, a central thickness of the fourth lens element is CT4, and the following condition is satisfied:

(|SAG41|+|SAG42|)/CT4<0.80.

20. An image capturing device, comprising:
the image capturing lens system of claim 1; and
an image sensor.

* * * * *